United States Patent
Sato et al.

(10) Patent No.: US 9,354,107 B2
(45) Date of Patent: May 31, 2016

(54) ITEM REGISTRATION APPARATUS AND MEASURING DEVICE

(71) Applicant: Teraoka Seiko Co., Ltd., Tokyo (JP)

(72) Inventors: Naokazu Sato, Tokyo (JP); Fumikatu Saitoh, Tokyo (JP); Kenichi Nishino, Tokyo (JP)

(73) Assignee: TERAOKA SEIKO CO., LTD., Tokyo (JP)

( * ) Notice: Subject to any disclaimer, the term of this patent is extended or adjusted under 35 U.S.C. 154(b) by 0 days.

(21) Appl. No.: 14/494,830

(22) Filed: Sep. 24, 2014

(65) Prior Publication Data

US 2015/0083805 A1   Mar. 26, 2015

(30) Foreign Application Priority Data

Sep. 25, 2013   (JP) ................................ 2013-199062
Oct. 25, 2013   (JP) ................................ 2013-222142
Oct. 28, 2013   (JP) ................................ 2013-222952
Oct. 28, 2013   (JP) ................................ 2013-223593

(51) Int. Cl.
*G07G 1/00* (2006.01)
*G01G 19/414* (2006.01)
(Continued)

(52) U.S. Cl.
CPC .......... *G01G 19/4144* (2013.01); *B41J 3/4075* (2013.01); *G06Q 10/08* (2013.01); *G06Q 20/204* (2013.01); *G06Q 20/208* (2013.01); *G06Q 20/322* (2013.01); *G07G 1/0072* (2013.01); *G07G 1/0081* (2013.01)

(58) Field of Classification Search
USPC .......................... 235/383, 375; 705/16, 21, 28
See application file for complete search history.

(56) References Cited

U.S. PATENT DOCUMENTS 3,247,915 A   4/1966 Chilton
2004/0267621 A1 *  12/2004 Schuller et al. ................. 705/23
(Continued)

FOREIGN PATENT DOCUMENTS

DE   101 05 535 A1   8/2002
DE   102009045935 A1   7/2010
(Continued)

OTHER PUBLICATIONS

Partial European Search Report dated Jan. 29, 2015, issued in corresponding EP Patent Application No. 14185756.5 (5 pages).
(Continued)

*Primary Examiner* — Allyson Trail
(74) *Attorney, Agent, or Firm* — Westerman, Hattori, Daniels & Adrian, LLP

(57) ABSTRACT

The present invention provides an item registration apparatus and a measuring device cooperating with a mobile terminal to allow smooth registration of sold-by-weight items being purchased by a customer. The item registration apparatus comprises: a measuring device having a weighing tray on which an item is put; and a mobile terminal which can be connected to the measuring device via communication channel (access point or the like). When the item is put on said weighing tray of the measuring device and the measurement of the item is thus completed, the measuring device transmits transaction information of the measured item to the mobile terminal via the communication channel so that the transaction information is stored. This eliminates printing of code information on a label issued from the measuring device and operation of scanning the printed code information by using the mobile terminal.

14 Claims, 19 Drawing Sheets

(51) Int. Cl.
*B41J 3/407* (2006.01)
*G06Q 10/08* (2012.01)
*G06Q 20/20* (2012.01)
*G06Q 20/32* (2012.01)

(56) References Cited

U.S. PATENT DOCUMENTS

| | | | |
|---|---|---|---|
| 2007/0045413 A1* | 3/2007 | Patrick | 235/383 |
| 2014/0175164 A1* | 6/2014 | Allard | 235/375 |
| 2014/0258007 A1* | 9/2014 | Calman et al. | 705/16 |
| 2014/0258051 A1* | 9/2014 | Bostwick | 705/28 |
| 2015/0100460 A1* | 4/2015 | Howden et al. | 705/26.35 |
| 2015/0193763 A1* | 7/2015 | Cyr et al. | 705/21 |

FOREIGN PATENT DOCUMENTS

| | | |
|---|---|---|
| DE | 102009007733 A1 | 8/2010 |
| EP | 0 522 608 A1 | 1/1993 |
| JP | 09-198171 A | 7/1997 |
| JP | 2002-063652 A | 2/2002 |
| JP | 2002-132871 A | 5/2002 |
| JP | 2008-139987 A | 6/2008 |
| JP | 2011-103043 A | 5/2011 |
| WO | 2011/089317 A1 | 7/2011 |

OTHER PUBLICATIONS

Extended European Search Report dated Jun. 11, 2015, issued in counterpart European application No. 14185756.5 (11 pages).

* cited by examiner

Merchandise file

| Item code | Item name | Unit price (/100g) | ... |
|---|---|---|---|
| ○○○○○○○○ | Apple | 80 | ... |
| ○○○○○○○○ | Lemon | 92 | ... |
| ○○○○○○○○ | Tangerine | 62 | ... |
| ... | ... | ... | ... |

ITEM REGISTRATION APPARATUS AND MEASURING DEVICE

BACKGROUND OF THE INVENTION

1. Field of the Invention

The present invention relates to an item registration apparatus allowing smooth registration of sold-by-weight items and accounting thereof and to an account system having the item registration apparatus.

The present invention also relates to a measuring device and a measuring system, which is suitably used in the aforementioned item registration apparatus, for measuring an item and issuing a label for it.

2. Description of Related Art

In a conventional retail store such as a supermarket, a self-scanning system for improving efficiency of registration and checkout of items purchased by a customer is employed in which the customer oneself brings a mobile terminal as equipment of the store and scans code information on a label attached to each item to be purchased by the customer. According to the self-scanning system, the mobile terminal after scanning is brought together with the scanned items to an account device (POS register) by the customer and the code information stored in the mobile terminal is transferred to the account device, thereby completing the accounting of the scanned items.

On the other hand, there are sold-by-weight items (such as fruits, vegetables, and meats). As for such an item, the item of required amount is picked up from the item prepared in large quantities and is sold for a price according to the weight of the item. For the purpose of streamlining the work of selling such sold-by-weight items, a customer oneself puts an item of required amount on a measuring device to measure the weight of the item and attaches a label with code information, which is automatically issued from the measuring device after measurement. If the customer oneself should register the sold-by-weight item, the customer furthermore scans the code information of the attached label by using the mobile terminal.

In case of the aforementioned method of registering sold-by-weight items, however, the work of scanning cord information on the label for registering the item is troublesome. Further, there is a problem that scanning is sometimes impossible depending on the printed condition or the way of scanning the code information and also there may be a problem that a customer neglects of scanning the code information on the label.

In case that a customer purchases a plurality of sold-by-weight items, for example, the measuring device measures the weight of each item of an amount desired by the customer and calculates the purchased price of each item. After measuring and calculating the purchased price of the last item, the measuring device issues a label on which code information such as bar code is printed. The code information is used to obtain the total amount of purchased prices of the plurality of items being purchased by the customer and is used as information of a specific section covering the plurality of items being purchased by the customer. It should be noted that the specific section means a fruit and vegetable section in case of cabbages, cucumbers, and apples, a raw fish section in case of tunas and salmons, or the like.

In case that the customer purchases a plurality of sold-by-weight items as mentioned above so that a single label for the plurality of items is issued and the code information on the label is scanned by the mobile terminal, there is a problem that the purchased price is reported simply as sales of the specific section (for example, the fruit and vegetable section) and it is impossible manage sales of each item (for example, cabbage and apple). Especially in case of using bar codes as the code information, the problem is pronounced because the amount of information is limited.

On the other hand, another way is considerable for a case that a customer purchases a plurality of sold-by-weight items, in which the measuring device issues a label for each measurement of each item. According to this format, label for the respective items are issued and code information on these labels is scanned, whereby it is possible to manage sales of each item. In this method, however, the operation is troublesome because the customer should scan code information on a plurality of labels by using the mobile terminal. Moreover, the customer may forget which labels have been scanned.

Furthermore, when the customer registers the item by scanning code information on a label of the sold-by-weight item, the customer may mistakenly scan the code information of the label twice. In such a case, the item being purchased by the customer is registered doubly and the payment for this should be conducted based on the transaction information of doubly registered item. For this, there is a need of any means for preventing double registration of items into the mobile terminal.

Besides the aforementioned self-scanning system, conventionally, there is a typical operating method in which a customer puts items to be purchased into a shopping basket and brings the shopping basket to an account device (checkout device), and a staff standing by the account device scans code information on labels attached to the respective items so as to conduct registration and checkout, and also an operating method in which the typical operating method and the self-scanning system are mixed in the same store. Therefore, a measuring device for sold-by-weight items capable of handling any operating method is desired. That is, a measuring device for sold-by-weight items is desired which can issue rapidly and easily labels in case of using the mobile terminal and also labels in case of not using the mobile terminal even though printed conditions are different from each other.

SUMMARY OF THE INVENTION

The present invention has been made in consideration of the aforementioned points. It is an object of the present invention to provide an item registration apparatus allowing easy registration of sold-by-weight items to be purchased by a customer by using a mobile terminal and to provide an account system comprising the item registration apparatus.

Further, another object of the present invention is to provide an item registration apparatus capable of effectively preventing double registration of an item being purchased by a customer and to provide an account system comprising the item registration apparatus.

Furthermore, another object of the present invention is to provide a measuring device and a measuring system capable of easily and rapidly issuing either of labels in case of using external equipment such as a mobile terminal and labels in case of not using the external equipment.

The present invention provides an item registration apparatus comprising: a measuring device having a weighing tray on which an item is put; and a mobile terminal which can be connected to said measuring device via communication channel, wherein at the timing when the item is put on said weighing tray of said measuring device and the measurement of the item is completed or at the timing when predetermined operation such as pressing an operation button on said measuring device is conducted, said mobile terminal stores transaction information of the measured item.

As mentioned above, the mobile terminal and the measuring device are connected via the communication channel so that the transaction information of item(s) measured by the measuring device is stored in the mobile terminal, thereby eliminating operation using the mobile terminal of scanning code information printed on a label. Therefore, this enables easy registration of sold-by-weight items by using the mobile terminal. In addition, this can securely eliminate the problem that a customer cannot scan the code information and also the problem that a customer neglects of scanning the code information. The operation buttons of the measuring device includes various operation buttons such as a label issuing button, a continue shopping button, and an item selecting button.

Further, according to the present invention, when items to be measured are plural, said mobile terminal stores transaction information of the plurality of items once for every item at either of said timings.

Accordingly, even if the customer purchases a plurality of sold-by-weight items, management about individual items can be easily conducted according to the respective transaction information of items.

Further, according to the present invention, said measuring device further has a label issuing portion for issuing a label, and said measuring device issues a label indicating that the item put thereon has been measured when an operation button for ordering issuance of the label is pressed.

Because the label indicating that the item has been measured is issued, the customer easily visually confirms that the item was correctly measured by operation of the measuring device.

The present invention further provides an account system comprising: the aforementioned item registration apparatus and an account device for charging items, wherein said account device has an acquisition means for acquiring transaction information of the measured item stored in said mobile terminal, and wherein said account device charges according to the obtained transaction information of the measured item.

Since the transaction information of the measured item can be easily transmitted from the mobile terminal to the account device, the time required for accounting at the account device can be shortened, thus providing smooth accounting and also enabling sales management of respective items.

The present invention further provides a mobile terminal which can be connected to a measuring device via communication channel, said measuring device having a weighing tray on which an item is put, wherein at the timing when the item is put on said weighing tray of said measuring device and the measurement of the item is completed or at the timing when predetermined operation such as pressing an operation button on said measuring device is conducted, said mobile terminal stores transaction information of the measured item.

As mentioned above, the mobile terminal is connected to the measuring device via the communication channel so that the transaction information of item(s) measured by the measuring device is stored in the mobile terminal, thereby eliminating operation using the mobile terminal of scanning code information printed on a label. Therefore, this enables easy registration of sold-by-weight items by using the mobile terminal. In addition, this can securely eliminate the problem that a customer cannot scan the code information and also the problem that a customer neglects of scanning the code information.

The present invention further provides an item registration apparatus comprising: a measuring device having a weighing tray on which an item is put; and a mobile terminal having a scanning means for scanning code information recording transaction information of the item, said measuring device and said mobile terminal being connected via communication channel, wherein said measuring device has a label issuing means which issues a label of the item measured when the measurement of the item put on said weighing tray is completed or when a predetermined operation is conducted relative to said measuring device, wherein said mobile terminal has a first storage means for storing transaction information of the item via said communication channel when the measurement of the item put on said weighing tray is completed or when said predetermined operation is conducted, and wherein said label issuing means issues a label not including said code information when said first storage means stores transaction information of the item, and issues a label including said code information when said first storage means does not store transaction information of the item.

That is, the present invention provides the item registration apparatus in which the mobile terminal and the measuring device are connected via the communication channel and which issues a label not including the code information when the transaction information of the measured item is registered in the mobile terminal and issues a label including the code information when the transaction information of the measured item is not registered in the mobile terminal. It should be noted that the predetermined operation includes operation such as pressing a label issuing button, pressing a continue shopping button, pressing an item selecting button, and the like.

When the transaction information of the measured item is registered in the mobile terminal via the communication channel, the scanning of the code information by the mobile terminal is eliminated, thereby enabling easy registration of the measured item to the mobile terminal. In addition, since the customer can visually confirm whether the issued label contains the code information or not, the customer can recognize whether the transaction information of the measured item is correctly stored in the mobile terminal or not. That is, the customer can visually and securely confirm the state of registration in the mobile terminal, thereby preventing double registration of transaction information of item into the mobile terminal.

According to the present invention, the item registration apparatus further comprises: a detection means for detecting transaction information of items stored in said first storage means when said scanning means scans said code information of said label; and an informing means wherein when said detection means detects that the transaction information of item read from said code information is already stored in said first storage means, said informing means informs that the transaction information of the item is already stored, on the other hand when said detection means detects that the transaction information of item read from said code information is not stored in said first storage means, the transaction information of said item is stored in said first storage means and said informing means informs that the transaction information of said item is now stored.

According to the present invention, when the code information on the label is scanned by the mobile terminal, the apparatus detects whether the transaction information of item corresponding to the scanned code information is already stored or not. As a result of the detection, the apparatus informs that the transaction information of item is already stored when the transaction information of item corresponding to the scanned code information is already stored, and stores the transaction information of item according to the scanned code information and informs that the transaction information of item is now stored when the transaction information of item corresponding to the scanned code information is still not stored. This prevents double registration of the transaction information of item being purchased into the mobile terminal and also prevents omission of registration of the transaction information of item. That is, the transaction information of items being purchased can be correctly registered.

Further, according to the present invention, when said informing means informs that the transaction information of the item is already stored, said informing means informs an option whether or not to additionally store the transaction information of the item in said first storage means, and wherein when additional storage is selected, said transaction information of the item is additionally stored in said first storage means.

That is, according to the present invention, the informing means also informs an option whether or not to additionally store the transaction information when informing that the transaction information of the item is already stored. Accordingly, the transaction information of the item is stored in the mobile terminal when additional storage is selected and the transaction information of the item is not stored in the mobile terminal when no additional storage is selected, thereby preventing the same item from being doubly registered by mistake.

Further, according to the present invention, said measuring device further has a second storage means for storing the transaction information of the measured item, wherein when a plurality of items are measured, said second storage means stores transaction information of each measured item after each measurement of the item put on the weighing tray until the last one of the items put on the weighing tray for measurement is measured, and when the measurement of the last one of the items put on said weighing tray is completed or when the predetermined operation is conducted, said first storage means stores the transaction information of every item of the measured items stored in said second storage means.

Even when the customer purchases a plurality of sold-by-weight items, the transaction information of respective items stored in the measuring device can be stored in the mobile terminal, whereby management of individual items can be easily conducted.

Furthermore, the present invention provides an account system comprising: the aforementioned item registration apparatus; and an account device for charging items, wherein said account device has an acquisition means for acquiring transaction information of the measured item stored in said first storage means, and wherein said account system charges according to the obtained transaction information of the measured item.

The sold-by-weight item being purchased by the customer can be easily registered into the account device by using the mobile terminal, thereby enabling smooth accounting. The account system also enables easy management of individual items based on data after purchased.

The present invention further provides a measuring device which has a weighing tray on which an item is put and is connected to a mobile terminal via communication channel, said mobile terminal comprising a scanning means for scanning code information including transaction information of the item, wherein said measuring device comprises a label issuing means which issues a label of the item measured when the measurement of the item put on said weighing tray is completed or when a predetermined operation is conducted relative to said measuring device, wherein said measuring devices makes said mobile terminal store transaction information of the item via said communication channel when the measurement of the item put on said weighing tray is completed or when said predetermined operation is conducted, and wherein said label issuing means issues a label not including said code information when said mobile terminal stores transaction information of the item, and issues a label including said code information when said mobile terminal does not store transaction information of the item.

Since the need of scanning the code information by the mobile terminal is eliminated when the transaction information of the measured item is registered into the mobile terminal via the communication channel, the registration of the measured item into the mobile terminal is easily conducted. In addition, since the customer can visually confirm whether the issued label contains the code information or not, the customer can recognize whether the transaction information of the measured item is correctly stored in the mobile terminal or not. That is, the customer can visually and securely confirm the state of registration in the mobile terminal, thereby preventing double registration of transaction information of item into the mobile terminal.

Further, the present invention provides a measuring device for issuing a label for an item measured, comprising: a communication means for allowing communication with external equipment; a first issuing control means for controlling issuance of a label on the basis of, at least, a measurement stable signal for the item measured by said measuring device and a signal received from said external equipment when communication with said external equipment via the communication means is detected; and a second issuing control means for controlling issuance of a label on the basis of, at least, said measurement stable signal when communication with said external equipment is not detected.

The signal received from the external equipment may be a signal from the external equipment indicating the receipt of the transaction information of item which was sent from the measuring device to the external equipment or a signal indicating the receipt by the measuring device as response to a return signal from the external equipment to the measuring device for proving the receipt of a signal which was sent from the external equipment for starting communication and was received by the measuring device (that is, a signal received from the external equipment for making sure that communication therebetween is established before the measuring device sends transaction information to the external equipment), alternatively or another receipt signal.

Therefore, the measuring device can easily and rapidly issue either of labels for a case that communication with the external equipment such as a mobile terminal is established and labels for a case that the communication is not established. The label issuing control includes control for not issuing label. Especially in case of the first issuing control means, sometimes issuance of label is not required because the transaction information of item(s) is sent to the external equipment.

Further, according to the present invention, the printing form of the label issued by said first issuing control means may be different from the printing form of the label issued by said second issuing control means.

Accordingly, the customer can visually confirm whether or not the communication with the external equipment was established when the label was issued. The difference in printing form is a difference which can be visually confirmed or a difference which can be confirmed magnetically or optically even visually indistinguishable.

Further, according to the present invention, said printing forms may be varied by not printing code information on the label issued by said first issuing control means and printing code information on the label issued by said second issuing control means.

Accordingly, the customer can visually confirm whether or not the communication with the external equipment was established when the label was issued.

Furthermore, according to the present invention, after communication with said external equipment is established by said communication means, said measuring device sends the transaction information of the measured item to said external equipment.

Therefore, when the communication with the external equipment is established, transaction information of item(s) measured by the measuring device can be securely sent to and stored in the external equipment. Since the transaction information of item(s) is stored in the external equipment, easy accounting at the account device is allowed by using the transaction information of the item(s).

Moreover, according to the present invention, when no receipt signal is received from said external equipment within a predetermined time period after the transaction information of the item is sent from said measuring device to said external equipment, the measuring device issues a label equal to the label issued by said second issuing control means.

When the transaction information of item measured by the measuring device is not received by the external equipment, it means that the communication with the external equipment is not established. In this case, the measuring device issues a label equal to the label issued by the second issuing control means.

The present invention further provides a measuring system comprising: the aforementioned measuring device; and external equipment which can communicate with said measuring device.

DETAILED DESCRIPTION

Hereinafter, embodiments of the present invention will be described in detail with reference to the accompanying drawings.

Figure 1:
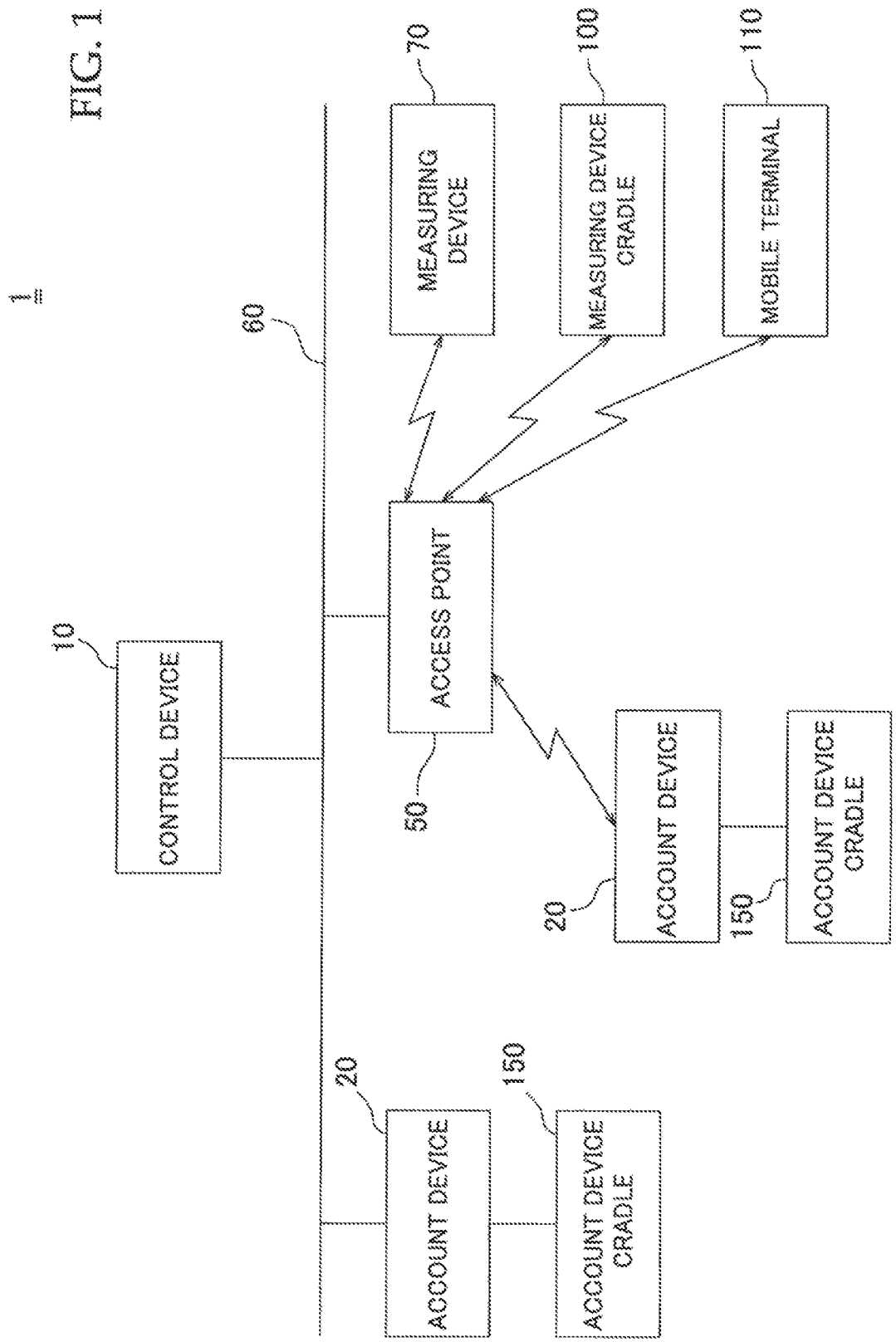
FIG. 1 is a system configuration diagram showing an example of an account system 1.
Figure 2:
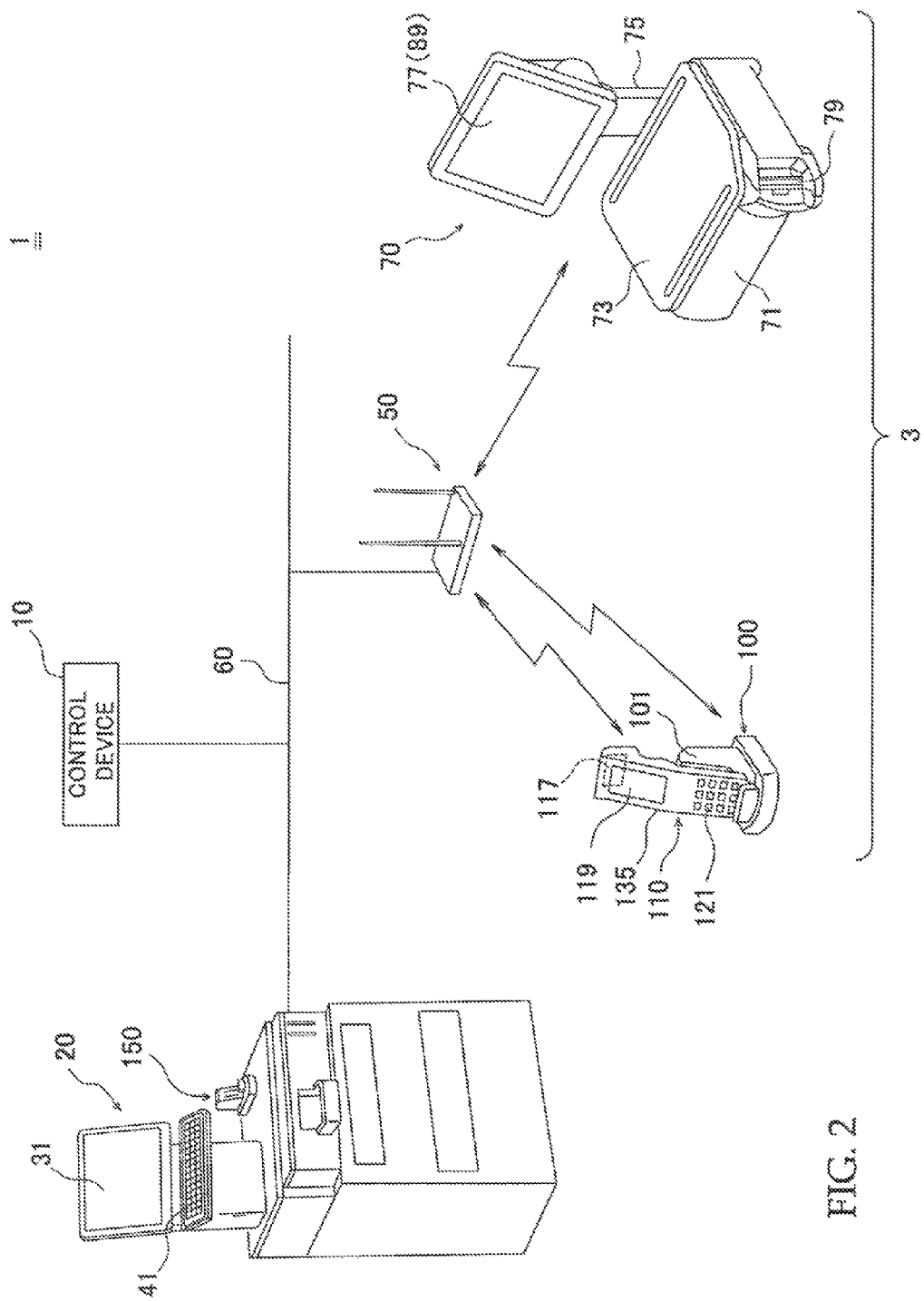
FIG. 2 is a system configuration diagram showing devices composing main components of the present invention in a perspective view.

FIG. 1 is a system configuration diagram showing an example of an account system 1 comprising an item registration apparatus 3 according to an embodiment of the present invention. FIG. 2 is a system configuration diagram showing devices such as a measuring device 70 within the system configuration diagram of FIG. 1 in a perspective view. As shown in these drawings, the account system 1 comprises a control device 10, an account device 20, an access point (communication means) 50, and a LAN 60. The control device 10, the account device 20, and the access point 50 are connected by the LAN 60. The account system 1 further comprises a measuring device 70, a measuring device cradle 100, an external device (hereinafter, referred to as "mobile terminal") 110, and another account device 20 which are connected to the LAN 60 via the access point 50. Each account device 20 is provided with an account device cradle 150 as a scanning means connected to the account device 20. Connection between the respective devices may be wired or wireless. In this embodiment, the measuring device 70, the measuring device cradle 100, the mobile terminal 110, and communication channel (the access point 50 and the like) between them constitute an item registration apparatus 3. Also in this embodiment, the item registration apparatus 3 composes a measuring system.

Figures 24, 25:
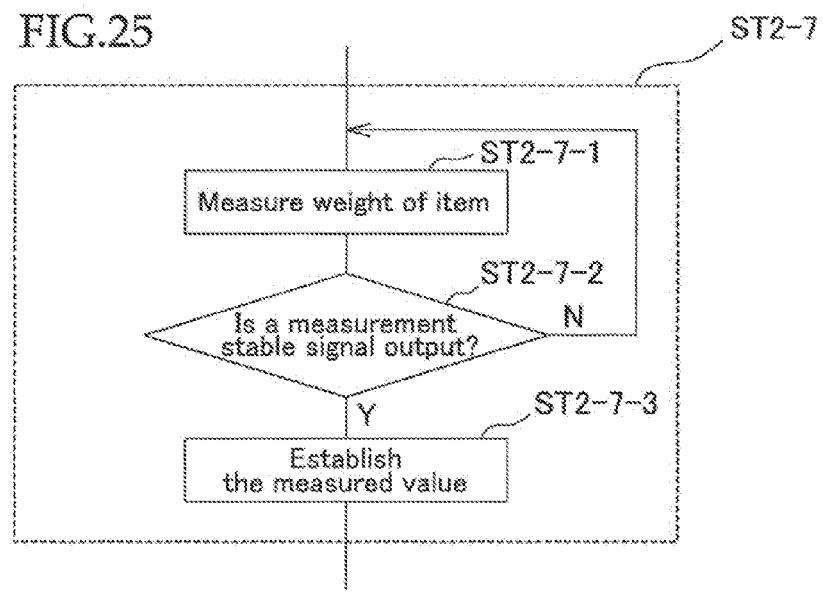
FIG. 24 is an illustration showing an example of a merchandise file.
FIG. 25 is a diagram showing details of the process at a step ST2-7.

The control device 10 is a computer for controlling the account system 1 and manages various information including a merchandise master file. The merchandise master file is a file in which information of items such as item names, item codes, sales prices and the like of respective items are stored and which is suitably updated. The control device 10 timely sends the latest merchandise master file as a merchandise file to the respective account devices 20, the measuring device 70, and the mobile terminal 110. FIG. 24 is an illustration showing an example of the merchandise file. As shown in FIG. 24, the merchandise file stores an item code, an item name, a unit price, and the like for every item.

The account device 20 is a POS register for conducting registration and accounting of items being purchased by a customer and comprises an operating portion 41 having various operation buttons and a display 31 composed of a liquid crystal touch panel.

Figure 3:
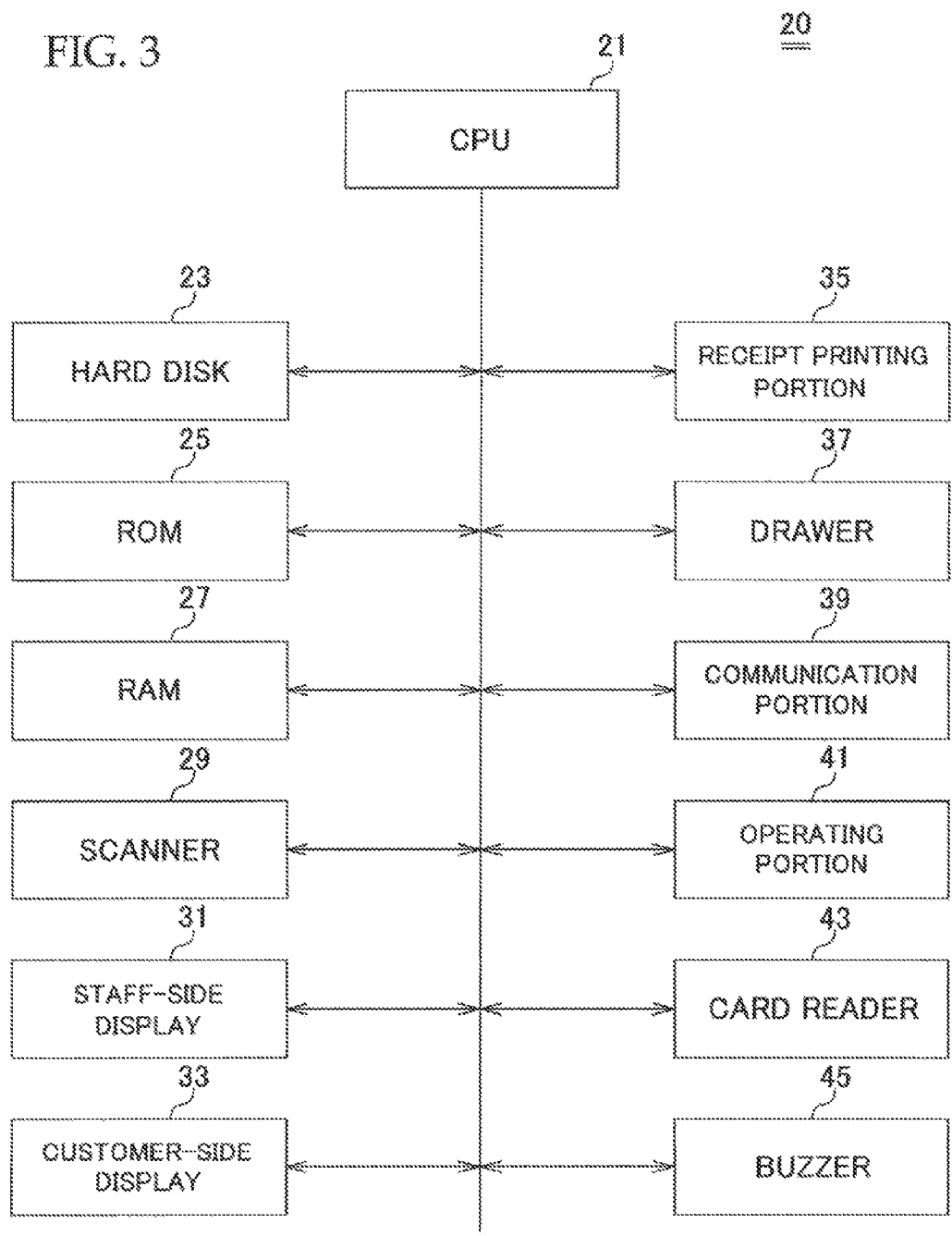
FIG. 3 is a functional block diagram showing an example of an account device 20.

FIG. 3 is a functional block diagram showing an example of an account device 20. As shown in FIG. 3, the account device 20 comprises a CPU 21 for controlling the operation of the account device 20, a hard disk 23 for storing shopping information of customers, a ROM 25 for storing program conducted by the CPU 21, a RAM (storage) 27 for storing various information, a scanner 29 for optically scanning bar codes (item codes) attached to items, a staff-side display 31 for displaying item names, prices and the like, and a customer-side display 33, a receipt printing portion 35, a drawer 37 for keeping cashes, cash vouchers, and the like, a communication portion 39, the operating portion 41 having various operation buttons and the like for operating the account device 20, a card reader 43 for reading information on a credit card if a customer wants to pay by the credit card, and a buzzer 45 for emitting a sound when requiring check of operation. The respective components are connected to each other via buses. In the RAM 27, the merchandise file obtained from the control device 10 and transaction information of items sent from the mobile terminal 110 as will be described later are stored. The communication portion 39 communicates with the mobile terminal 110 set in the account device cradle 150 via the account device cradle 150 and also communicates with the control device 10 via the LAN 60.

The account device cradle 150 is communicably connected to the account device 20 with or without wires so that the transaction information of items stored in RAM 115 as will be described below of the mobile terminal 110 set in the account device cradle 150 are imported into the account device 20.

As shown in FIG. 2, the measuring device 70 comprises a body portion 71, a weighing tray 73 put on the top of the body portion 71, a display 77 disposed on the top of a support 75 attached to the rear of the body portion 71, and a label output 79 formed at a predetermined position of an outer surface of the body portion 71.

Figure 4:
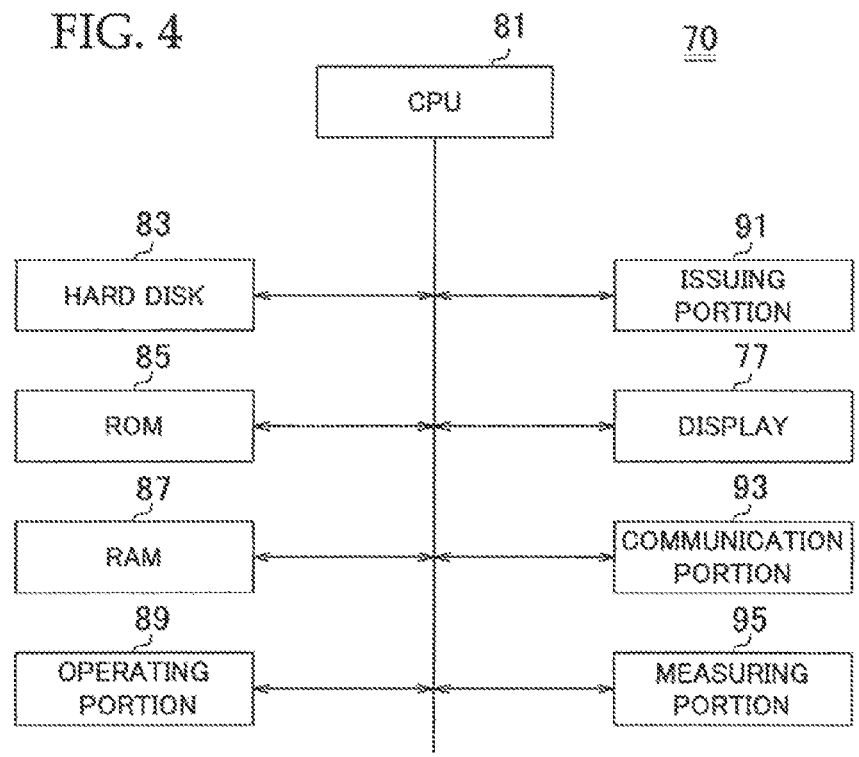
FIG. 4 is a functional block diagram showing an example of a measuring device 70.

FIG. 4 is a functional block diagram showing an example of the measuring device 70. As shown in FIG. 4, the measuring device 70 comprises a CPU 81 for controlling the operation of the measuring device 70, a hard disk 83 for transmitting information stored in a RAM 87 after completion of measurement and storing the information, a ROM 85 for storing program conducted by the CPU 81, the RAM 87 for storing various information, an operating portion 89 for operating the measuring device 70, an issuing portion (label issuing means) 91 for issuing labels on which data based on the measurement are printed, the display 77 for displaying operating procedures of the measuring device 70 and results of measurement, a communication portion (communicating means) 93 for communicating with other components such as the mobile terminal 110, and a measuring portion 95 having load cells for measuring the weight of a sold-by-weight item. The respective components are connected to each other via buses. The display 77 is composed of a liquid crystal touch panel so that the display 77 functions not only as the display 77 but also as the operating portion 89. The RAM 87 is a second storage means for storing the merchandise file obtained from the control device 10 and transaction information for every item measured by the measuring device 70.

The measuring device cradle 100 shown in FIG. 1 and FIG. 2 comprises a CPU and a memory, has a stand 101 which can support the mobile terminal 110 thereon as shown in FIG. 2, and still has a communication function for communicating with the access point 50 and the mobile terminal 110 put in the measuring device cradle 100. The measuring device cradle 100 has a one-on-one relationship with the predetermined measuring device 70 and an identification number (IP address or the like) of the measuring device 70 corresponding to the one-on-one relationship is stored in the memory of the measuring device cradle 100. When the mobile terminal 110 is placed in the measuring device cradle 100, the identification number (IP address or the like) of the measuring device 70 corresponding to the measuring device cradle 100 is sent to the mobile terminal 110 from the measuring device cradle 100 and is stored in a predetermined area of the RAM 115 of the mobile terminal 110. Accordingly, the mobile terminal 110 knows the identification number (IP address or the like) of the measuring device 70 communicating therewith.

That is, a measuring device cradle 100 having a one-on-one relationship with the measuring device 70 is preliminarily prepared. By placing the mobile terminal 110 in the measuring device cradle 100, the mobile terminal 110 recognizes from information of the measuring device cradle 100 which measuring device 70 to communicate with. Therefore, the mobile terminal 110 easily specifies which measuring device 70 to communicate with. At the start of communication with the measuring device 70 of the identification number (IP address or the like) to be sent, the mobile terminal 110 also sends an identification number (IP address or the like) of the mobile terminal 110 itself. Accordingly, the measuring device 70 receiving information recognizes to which mobile terminal to send data such as transaction information of items, thereby enabling data communication therebetween.

As shown in FIG. 2, the mobile terminal 110 has a display screen 119 and an operating portion 121 on a front surface of a body casing 135 thereof. The mobile terminal 110 is provided with a scanner 117 on a rear surface of an upper portion (the back of the display screen 119) of the mobile terminal 110. The mobile terminal 110 is provided with a plurality of contacts on a rear surface of a lower portion of the mobile terminal 110. As the mobile terminal 110 is placed in the measuring device cradle 100, the contacts are connected to contacts provided on the measuring device cradle 100 so as to achieve the communication therebetween. Among the contacts of the mobile terminal 110, there are contacts for charging a rechargeable battery 127 as will be described later of the mobile terminal 110 when connected to the contacts of the measuring device cradle 100.

Figure 5:
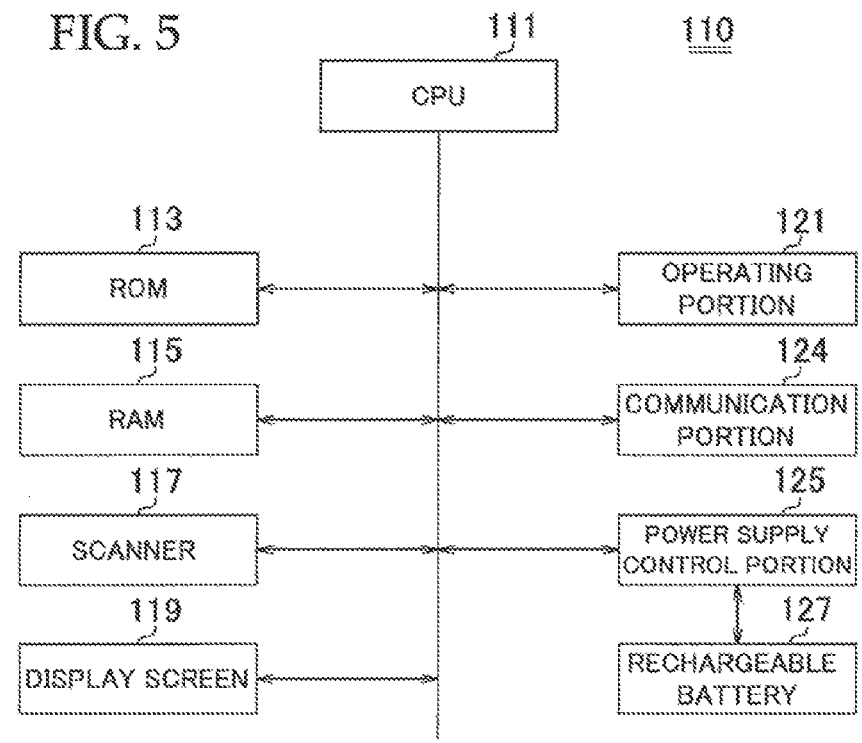
FIG. 5 is a functional block diagram showing an example of a mobile terminal 110.

FIG. 5 is a functional block diagram showing an example of the mobile terminal 110. As shown in FIG. 5, the mobile terminal 110 comprises a CPU 111, a ROM 113, a RAM (storage) 115, the scanner 117, the display screen 119, the operating portion 121, a communication portion (communicating means) 124, and a power supply control portion 125. These components are connected via buses. Connected to the power supply control portion 125 is the rechargeable battery 127.

The CPU 111 controls the operation of the mobile terminal 110. The ROM 113 stores program conducted by the CPU 111. The RAM 115 is a first storing means for storing the merchandise file obtained from the control device 10, transaction information of each item measured by the measuring device 70, the identification number (IP address or the like) of the measuring device 70 communicating with the mobile terminal 110.

The scanner 117 is a scanning means for scanning code information (for example, bar code and two-dimensional code) on labels attached to items. The code information scanned by the scanner 117 is converted into data of a predetermined format, is then output, and is stored in the RAM 115 as information specifying the item being purchased.

The display screen 119 is composed of, for example, a liquid crystal display panel and indicates instructions for use of the mobile terminal 110 and the measuring device 70 and various messages such as the price of measured item. The operating portion 121 is composed of various buttons for operating the mobile terminal 110.

The communication portion 124 controls the communication with the measuring device 70, the control device 10 and the like connected to the mobile terminal 110 via the access point 50, and the communication with the measuring device cradle 100 and the account device cradle 150 in which the mobile terminal 110 is placed. When the mobile terminal 110 is placed in the measuring device cradle 100, the power supply control portion 125 controls the charge of the rechargeable battery 127 by electric power supplied from the measuring device cradle 100. The rechargeable battery 127 supplies electric power for operating the respective components of the mobile terminal 110.

Now, description will be made as regard to the operation of the account system 1 including the aforementioned item registration apparatus 3.

Figure 6:
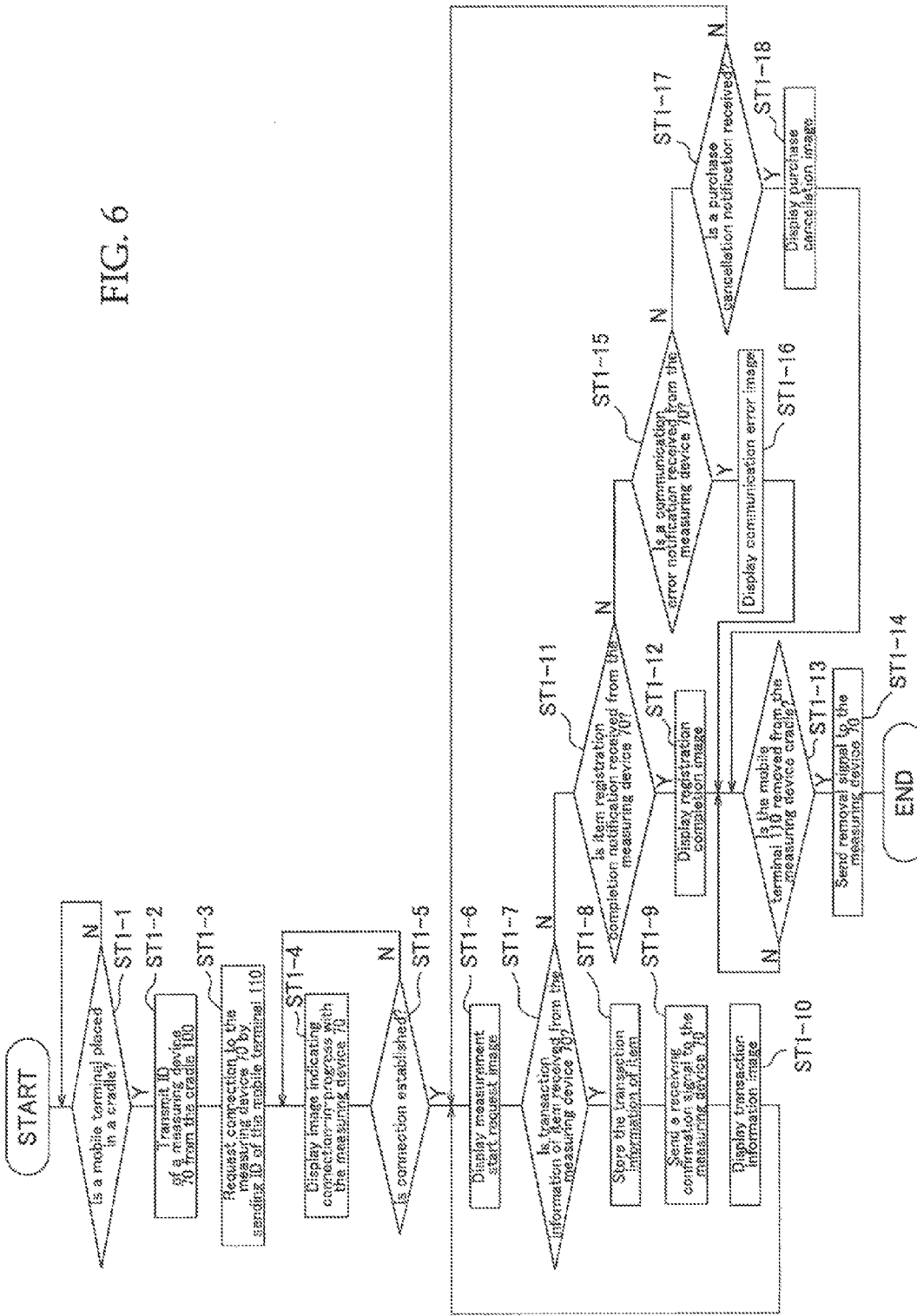
FIG. 6 is a flow chart showing one operational example of the mobile terminal 110.
Figure 7:
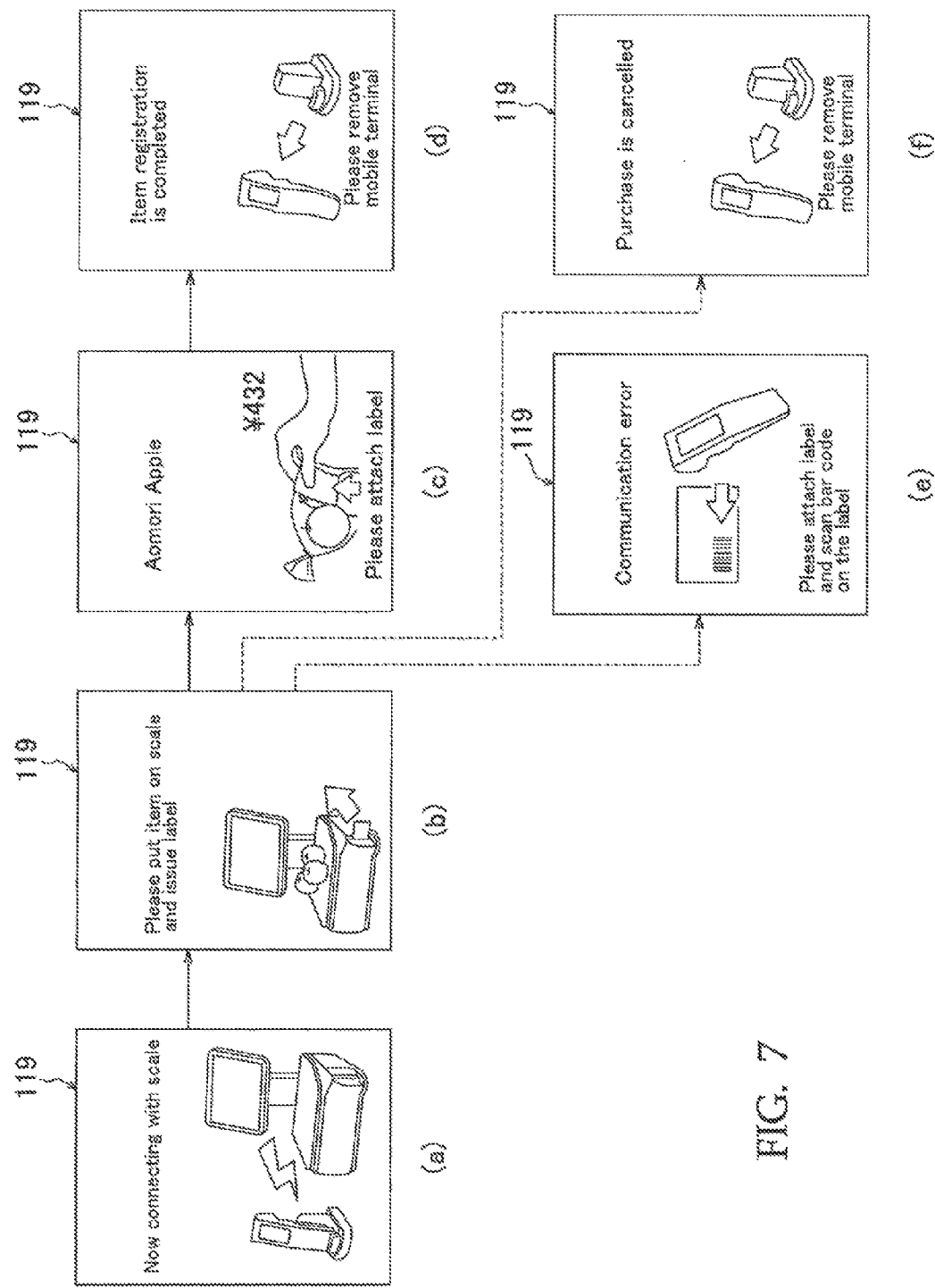
FIG. 7 is an illustration showing display images on a display screen 119.

First, an example of operation of the mobile terminal 110 will be described. FIG. 6 is a flow chart showing one operational example of the mobile terminal 110. FIG. 7 is an illustration showing display images on the display screen 119 of the mobile terminal 110.

As shown in FIG. 6, when the mobile terminal 110 is placed in the measuring device cradle 100 (Step ST1-1), the identification number (IP address or the like) of the measuring device 70 preliminarily stored in the memory of the measuring device cradle 100 is input to the mobile terminal 110 and stored in the RAM 115 (Step ST1-2).

Then, the mobile terminal 110 sends a request of connection through communication to the measuring device 70 having the aforementioned identification number (IP address or the like) and sends the identification number (IP address or the like) of the mobile terminal 110 together with the aforementioned request (Step ST1-3). At this time, the display screen 119 of the mobile terminal 110 shows a connection-in-progress image indicating that it is now in the act of connecting with the measuring device 70 (Step ST1-4). The connection-in-progress image may include a message, for example, "Now connecting with scale . . ." and design.

By receiving a connection confirmation signal from the measuring device 70 as will be described later (Step ST2-4 of FIG. 8 (or Step ST2-4 of FIG. 10)), the connection with the measuring device 70 is established (Step ST1-5) so that the display screen 119 shows a measurement start request image as shown in FIG. 7(b) (Step ST1-6). The measurement start request image may include a message, for example, "Please put item on scale and issue label" and design. This prompts a customer to put a desired item on the weighing tray 73 of the measuring device 70 and to issue a label.

When receiving transaction information of the measured item (item name, weight, sales price, and the like) from the measuring device 70 after measurement by the measuring device 70 (Step ST1-7), the transaction information of the item is stored in the RAM 115 (Step ST1-8). In addition, a receiving confirmation signal indicating that the transaction information of the item is received is sent to the measuring device 70 (Step ST1-9). The display screen 119 shows a transaction information image as shown in FIG. 7(c) (Step ST1-10). Besides the item name and the sales price, the transaction information image may include a message and design for prompting the customer to attach the label to the item (or a package for the item). By returning to Step ST1-6, the display screen 119 shows the aforementioned measurement start request image and the mobile terminal 110 waits next signal from the measuring device 70.

When an item registration completion notification is received instead of transaction information of another item during displaying the measurement start request image of Step ST1-6 (Step ST1-11), the display screen 119 shows a registration completion image (Step ST1-12). The registration completion notification is a notification for informing completion of registration of all items being purchased by the customer and which is conducted at Step ST2-19 in FIG. 9 (or Step ST2-18 in FIG. 11). The registration completion image is an image indicating that registration of all items is completed and may include a message, for example, "Item registration is completed. Please remove mobile terminal" and design as shown in FIG. 7(d).

When it is detected that the mobile terminal 110 is removed from the measuring device cradle 100 (Step ST1-13), a removal signal is sent to the measuring device 70 of the identification number (IP address) stored in the RAM 115 at Step ST1-2 (Step ST1-14) and the transaction processes by using the mobile terminal 110 is terminated.

On the other hand, when a communication error notification is received from the measuring device 70 instead of transaction information of another item or the registration completion notification during displaying the measurement start request image of Step ST1-6 (Step ST1-15), the display screen 119 shows a communication error image (Step ST1-16). The communication error notification is a notification for informing that the communication between the mobile terminal 110 and the measuring device 70 is abnormal so that the transaction information of item sent from the measuring device 70 is not received by the mobile terminal 110 and which is conducted at Step ST2-26 in FIG. 9 (or Step ST2-25 in FIG. 11). The communication error image may include a massage, for example, "Communication error. Please attach label and scan bar code on the label" and a design. When it is detected that the mobile terminal 110 is removed from the measuring device cradle 100 (Step ST1-13), a removal signal is sent to the corresponding measuring device 70 (Step ST1-14) and the transaction process by using the mobile terminal 110 is terminated.

When a purchase cancellation notification is received instead of transaction information of another item, the registration completion notification, or the communication error notification during displaying the measurement start request image of Step ST1-6 (Step ST1-17), the display screen 119 shows a purchase cancellation image (Step ST1-18). The purchase cancellation notification is a notification for informing that the customer cancels measurement during the measurement by using the measuring device 70 and which is conducted at Step ST2-22 in FIG. 8 (or Step ST2-21 in FIG. 10). The purchase cancellation image may include a message, for example, "Purchase is cancelled. Please remove mobile terminal" and design as shown in FIG. 7(f). When it is detected that the mobile terminal 110 is removed from the measuring device cradle 100 (Step ST1-13), a removal signal is sent to the corresponding measuring device 70 (Step ST1-14) and the transaction process by using the mobile terminal 110 is terminated.

In case of the purchase cancellation of this example, the transaction information of items which has been stored in the RAM 115 is still stored so that these items of which labels have been issued before the purchase cancellation can be charged.

Next, an example of operation of the measuring device 70 will be described. FIG. 8 and FIG. 9 are flow charts showing one operational example of the measuring device 70. Further, FIG. 12 through FIG. 17 are illustrations showing display image examples on the display 77 of the measuring device 70. As the measuring method by the measuring device 70, there are two, that is, a measuring method using a mobile terminal 110 (first issuing control means) and a measuring method without using a mobile terminal 110 (second issuing control means). These methods will be described below in turn.

[In Case Using a Mobile Terminal 110 (First Issuing Control Means)]

By placing a mobile terminal 110 in a measuring device cradle 100, a connection request is sent from the mobile terminal 110 to a measuring device 70 of an IP address (identification number) received from the measuring device cradle 100 (Step ST2-1). Accordingly, a connection flag stored in the RAM 87 of the measuring device 70 is set from "0" to "1" (Step ST2-2). Then, an IP address (identification number) sent together with the connection request from the mobile terminal 110 is input and stored in the RAM 87 (Step ST2-3).

Figure 12:
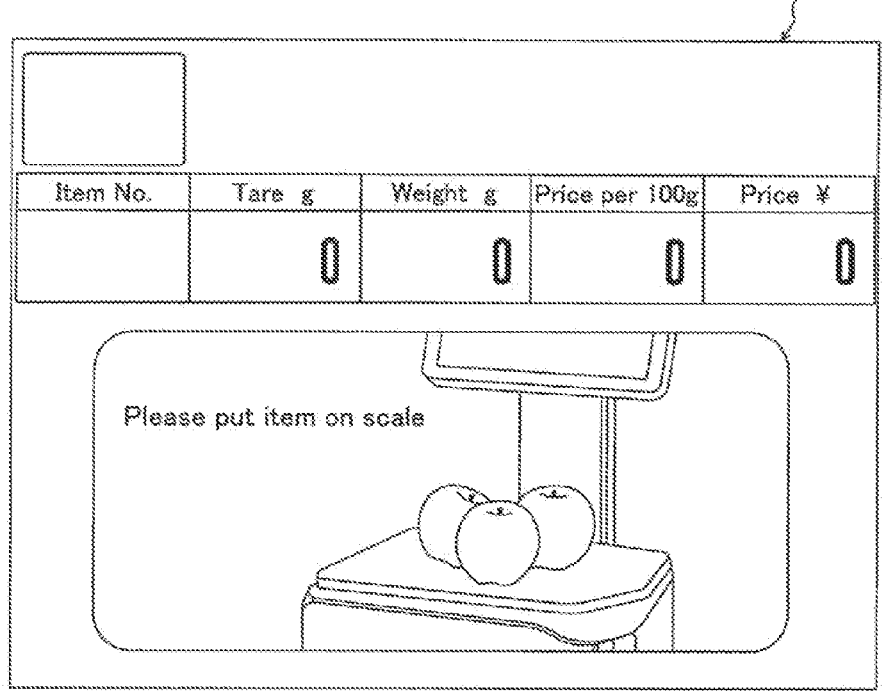
FIG. 12 is an illustration showing a display image example on a display 77 of the measuring device 70.

After the measuring device 70 sends a connection confirmation signal to the mobile terminal 110 having the IP address (identification number) of the mobile terminal 110 received and stored in the RAM 87 (Step ST2-4), the display 77 of the measuring device 70 displays a measurement start request image as shown in FIG. 12 (Step ST2-5). The measurement start request image is an image for prompting a customer to put an item on the measuring device 70 to measure the item and which may include a message, for example, "Please put item on scale" and design. This prompts the customer to put a desired item on the weighing tray 73 of the measuring device 70.

When the customer puts a desired amount of the item (apples in this example) on the weighing tray 73 (Step ST2-6), the measuring device 70 measures the weight of the item put on the weighing tray 73 according to the normal measuring operation (Step ST2-7). FIG. 25 is diagram showing details of the process at Step ST2-7. That is, as the item is put on the weighing tray 73, the weight of the item is measured (Step ST2-7-1). If a measurement stable signal indicating that the measured value of weight of the item put on the weighing tray 73 is stable is output (Step ST2-7-2), the measured value at this time is assumed as an established measured value (Step ST2-7-3).

Figure 13:
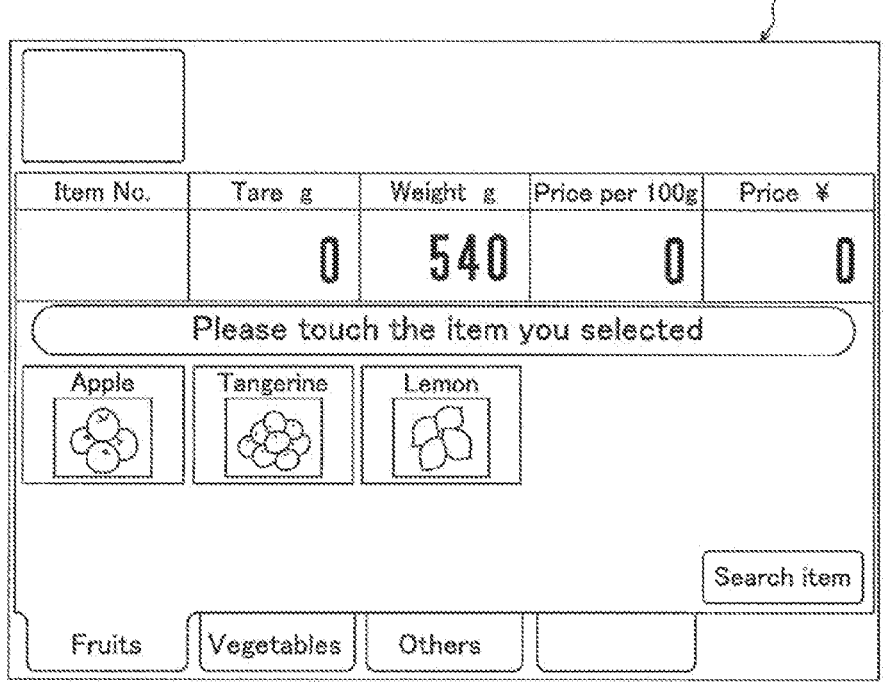
FIG. 13 is an illustration showing a display image example on the display 77 of the measuring device 70.

Then, the display 77 of the measuring device 70 displays an item selection image, for example, as shown in FIG. 13 (Step ST2-8). The item selection image is an image for prompting the customer to specify the item put on the weighing tray 73 and which may include a message, for example, "Please touch the item you selected" and tubs for selecting item name and kind (fruits, vegetables, and the like). The customer touches (operates) a tab with indicated item (item selecting buttons, operation buttons) to select the item put on (Step ST2-9). In this example, the customer touches the tub with apple image and name to select the item being measured. The selected item and its measured weight are stored in the RAM 87.

Figure 14:
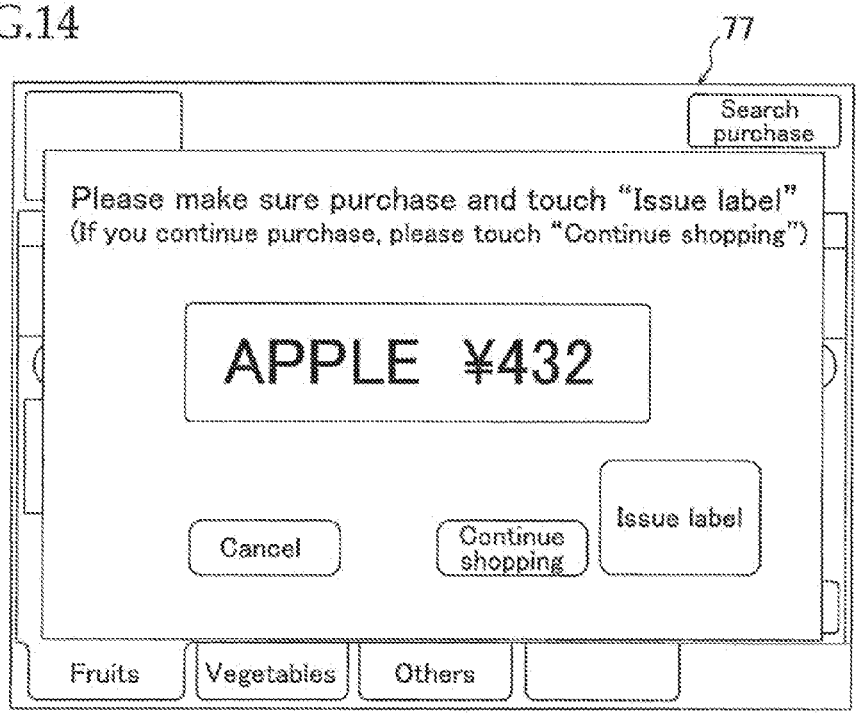
FIG. 14 is an illustration showing a display image example on the display 77 of the measuring device 70.

If the item is selected, the CPU 81 of the measuring device 70 calculates the price of the item using the merchandise file stored in the RAM 87 and the like and displays a purchase confirmation image, for example, as shown in FIG. 14 (Step ST2-10). The purchase confirmation image is an image for asking the customer whether to buy this item or not and which may include a message, for example, "Please make sure purchase and touch "issue label" (if you continue purchase, please touch "continue shopping"), the name and price of the measured item, a label issuing button, a continue shopping button, and a cancel button. These buttons are operation buttons for instructing operation.

When the customer touches the cancel button in the purchase confirmation image shown in FIG. 14 (Step ST2-11) and the connection flag is "1" (Step ST2-28), a purchase cancellation notification is sent to the mobile terminal 110 (Step ST2-22) and the process proceeds to Step ST2-20. When the purchase cancellation notification is received by the mobile terminal 110 as described above (Step ST1-17), the purchase cancellation image is displayed on the display screen 119 (Step ST1-18) to promote the customer to remove the mobile terminal 110 from the measuring device cradle 100. If the mobile terminal 110 is removed from the measuring device cradle 100 (Step ST1-13), a removal signal is sent to the corresponding measuring device 70 (Step ST-14). In the measuring device 70, at Step ST2-20, the connection flag is changed from "1" to "0" according to the receipt of the removal signal (Step ST2-21) and the measuring process at the measuring device 70 is terminated. As will be described below, when another item is measured after transaction information of one or more items previously measured is obtained, the purchase of the item may be cancelled. In this case, the obtained transaction information of the items is still stored in the RAM 115 of the mobile terminal 110.

On the other hand, when the label issuing button or the continue shopping button in the purchase confirmation image shown in FIG. 14 (Step ST2-12) is touched and the aforementioned connection flag is "1" (That is, the measuring device is connected to the mobile terminal 110) (Step ST2-13), the CPU 81 of the measuring device 70 sends the transaction information of measured item(s) (stored in the RAM 87) to the mobile terminal 110 having the IP address (identification number) stored in the RAM 87 at Step ST2-3 (Step ST2-14). The transaction information is information required for accounting of the measured item(s) and including at least the name(s) and weight(s) as measuring result (or the number converted from the weight) of the measured item(s). The transaction information may further include the unit price(s) and sales price(s) of the measured item(s) (In this example, the unit prices are not always necessary because they are also listed in the merchandise file stored in the RAM 115 of the mobile terminal 110. Further, the sales prices are not always necessary because they can be calculated by the mobile terminal 110).

When a receipt confirmation signal indicating the receipt of the transaction information of the item is received from the mobile terminal 110 within a predetermined time period, the process proceeds to Step ST2-16. On the other hand, when the aforementioned receipt confirmation signal is not received from the mobile terminal 110 within the predetermined time period, the process proceeds to Step ST2-24 (Step ST2-15).

Figure 18:
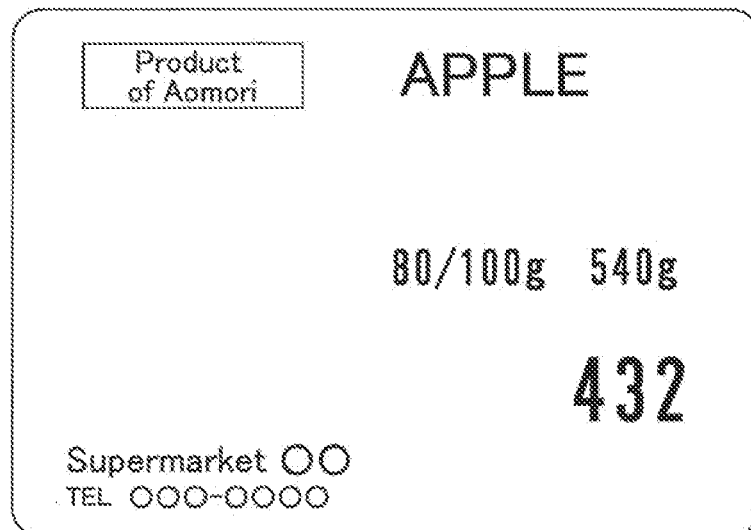
FIG. 18 is an illustration showing an example of label without code information.
Figure 26:
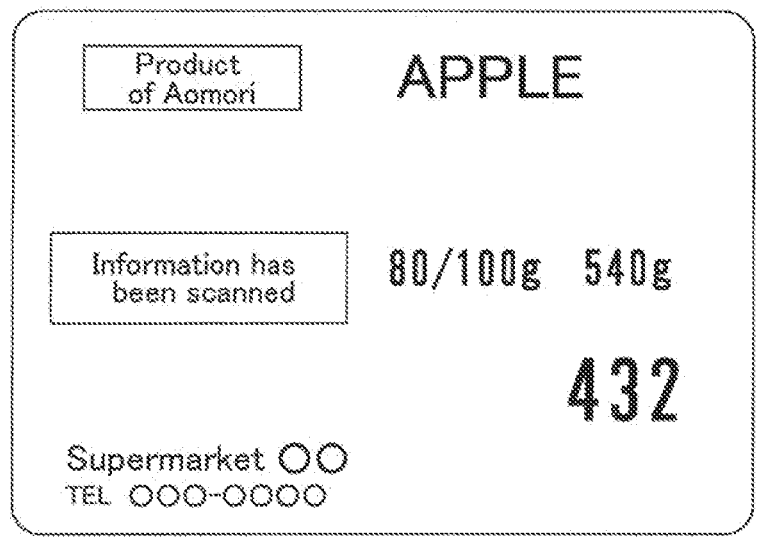
FIG. 26 is an illustration showing another example of the label without code information.

If the process proceeds to Step ST2-16, a label without code information is issued. FIG. 18 is an illustration showing an example of the label without code information. As shown in FIG. 18, the label does not include the code information. The reason why the code information is not printed on the label is that the transaction information of the item is already sent to the mobile terminal 110 from the measuring device 70 so that the code information as coded transaction information of the item is not necessary. No printing of the code information is further available to make the customer visually confirm that the transaction information of the item is already sent to the mobile terminal 110. Since there is a blank space at a portion where the code information is originally printed, another message or image such as "Information has been scanned" as shown in FIG. 26 may be printed.

Figure 15:
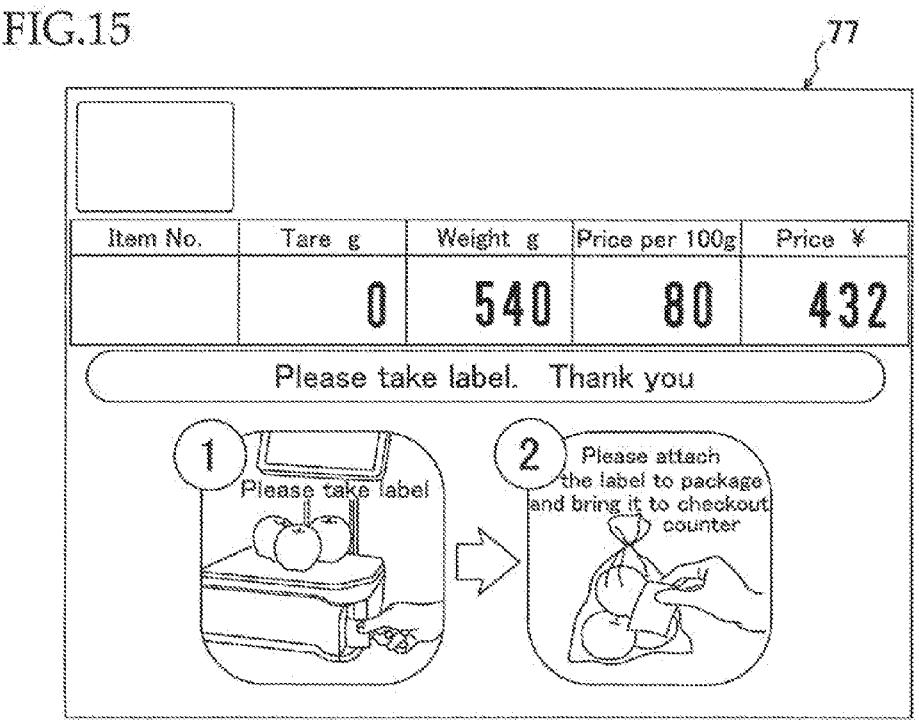
FIG. 15 is an illustration showing a display image example on the display 77 of the measuring device 70.

When the label issuing button in the aforementioned purchase confirmation image is touched, the display 77 shows a label-without-code issuance image, for example, as shown in FIG. 15 (Step ST2-17, Step ST2-18). The label-without-code issuance image on the display 77 includes information for promoting the customer to take the label from the measuring device 70 and attach the label to a package of the item. Then, an item registration completion notification is sent to the mobile terminal 110 (Step ST2-19). The aforementioned label issuing button functions as a completion button for declaring that the item placed and measured is the last item.

When the mobile terminal 110 is removed from the measuring device cradle 100 (Step ST1-13) and a removal signal is thus sent to the corresponding measuring device 70 (Step ST1-14), the measuring device 70 changes the connection flag from "1" to "0" according to the receipt of the removal signal at Step ST2-20 (Step ST2-21) so that the measuring process at the measuring device 70 is terminated.

Figure 16:
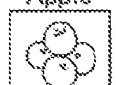
FIG. 16 is an illustration showing a display image example on the display 77 of the measuring device 70.

On the other hand, when the continue shopping button in the aforementioned purchase confirmation image is touched, the display 77 shows a restart measurement request image, for example, as shown in FIG. 16 (Step ST2-17, Step ST2-23). The restart measurement request image on the display 77 includes information for promoting the customer to put another item being purchased next on the measuring device 70 after taking the label from the measuring device 70 and attaching the label to a package of the item. Then, the process returns to Step ST2-6, the aforementioned measuring operation is repeated. The aforementioned continue shopping button functions as a declarative button for declaring that a plurality of items are measured.

Figure 19:
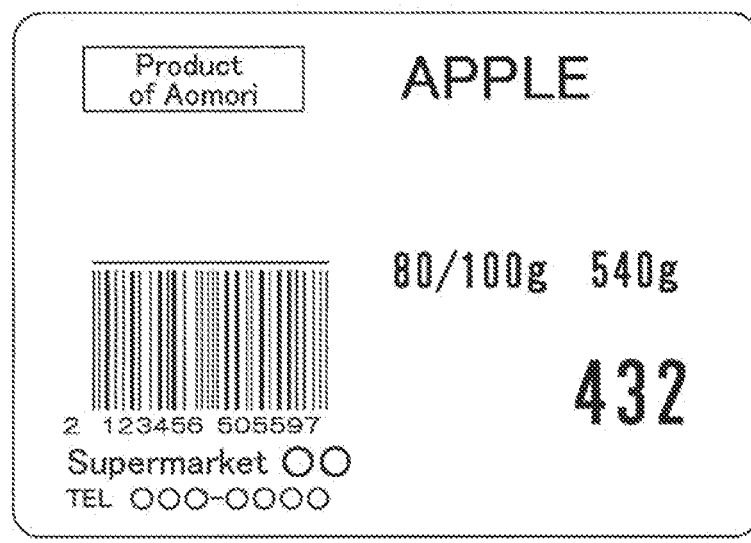
FIG. 19 is an illustration showing an example of label with code information.

On the other hand, when the process proceeds from the aforementioned Step ST2-15 to Step ST2-24, a label with code information is issued. FIG. 19 is an illustration showing an example of the label with code information. As shown in FIG. 19, the label includes the code information (in this example, a bar code). The reason why the code information is printed on the label is that the transaction information of the item is not stored in the mobile terminal 110 due to communication error between the measuring device 70 and the mobile terminal 110 so that the code information should be used to store the transaction information of the item into the mobile terminal 110 after that.

Figure 17:
FIG. 17 is an illustration showing a display image example on the display 77 of the measuring device 70.

Then, the display 77 shows a label-with-code information issued image, for example, as shown in FIG. 17 (Step ST2-25). The label-with-code information issued image on the display 77 includes instructions for promoting the customer to take the label from the measuring device 70 and attach the label to a package of the item, and further scan the bar code on the label. Then, a signal indicating communication error with the mobile terminal 110 is sent to the corresponding mobile terminal 110 (Step ST2-26).

When the mobile terminal 110 is removed from the measuring device cradle 100 (Step ST1-13) and a removal signal is thus sent to the corresponding measuring device 70 (Step ST1-14), the measuring device 70 changes the connection flag from "1" to "0" according to the receipt of the removal signal at Step ST2-20 (Step ST2-21) so that the measuring process at the measuring device 70 is terminated. The customer scans the code information on the aforementioned label by the scanner 117 of the mobile terminal 110 removed from the measuring device cradle 100 so that the transaction information of the item is stored in the RAM 115.

Figure 20:
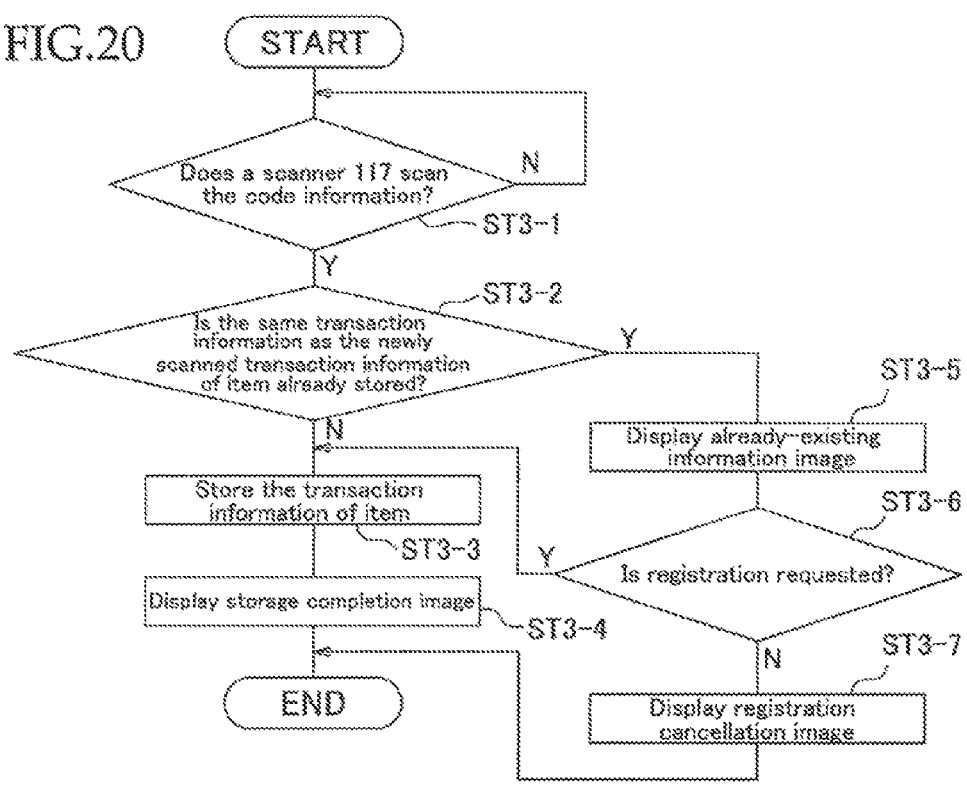
FIG. 20 is a flow chart of process for scanning the code information by the mobile terminal 110.
Figure 28A:
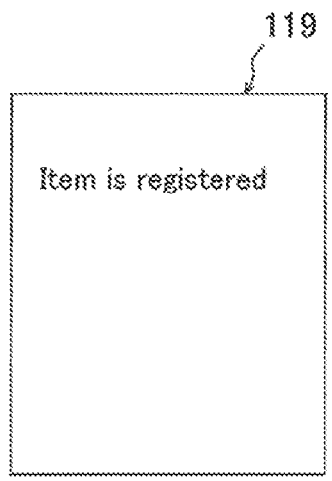
FIGS. 28A, 28B, 28C are illustrations showing an example of a display image on the display screen 119.

FIG. 20 is a flow chart of process for scanning the code information on the label by the mobile terminal 110. As shown in FIG. 20, when the scanner 117 of the mobile terminal 110 is brought close to the code information printed on the label and scans the code information on the label so as to obtain the transaction information of the item, the process proceeds to Step ST3-2 (Step ST3-1). At Step ST3-2, it is detected whether the same transaction information as the newly scanned transaction information of item is already stored in the RAM 115 or not. When the same transaction information as the newly scanned transaction information of item is still not stored, the newly scanned transaction information of the item is stored in the RAM 115 (Step ST3-3). The display screen 119 of the mobile terminal 110 displays a storage completion image, for example, as shown in FIG. 28A (Step ST3-4). The storage completion image may include a message, for example, "Item is registered". Accordingly, even when the transaction information of the item measured by the measuring device 70 cannot be sent from the measuring device 70 to the mobile terminal 110 via the communication channel, it is possible to store the transaction information of the item into the mobile terminal 110.

Figure 28B:
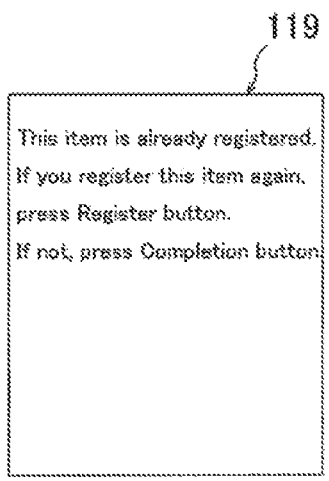

On the other hand, when the same transaction information as newly scanned transaction information of item is already stored in the RAM at Step ST3-2, the display screen 119 of the mobile terminal 110 displays an already-existing information image, for example, as shown in FIG. 28B (Step ST3-5). The already-existing information image may include a message, for example, "This item is already registered. If you register this item again, press Register button. If not, press Completion button." That is, the customer presses the register button if the customer purchases the same item again, while the customer presses the completion button if it is unintended doubly-registration of the same item.

Figure 28C:
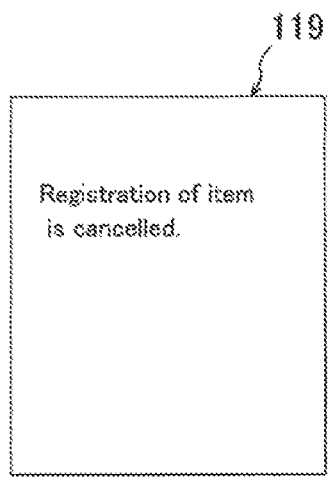

When the customer presses the completion button, for example, provided on the operating portion 121 of the mobile terminal 110 (see FIG. 2), it is determined that the registration is requested (Step ST3-6) and the process proceeds to Step ST3-3 where the scanned transaction information of the item is stored in the RAM 115 (Step ST3-3). Then, the display screen 119 of the mobile terminal 110 displays a registration completion image (Step ST3-4). On the other hand, when the customer presses the completion button, for example, provided on the operating portion 121, it is determined that the registration is not requested (Step ST3-6) and the process proceeds to Step 3-7 and the registration cancellation image, for example, as shown in FIG. 28C is displayed on the display screen 119 of the mobile terminal. The registration cancellation image may include a message, for example, "Registration of item is cancelled".

The CPU 111 conducting the processes of Steps ST3-1, 3-2 in the flow chart shown in FIG. 20 functions as a detecting means for detecting transaction information of item to be stored in the RAM 115 after the scanner 117 scans the code information of the label. The CPU 111 conducting the processes of Steps ST3-3, 3-4, 3-5 functions as an informing means. That is, when the transaction information of item obtained from the code information is already stored in the RAM 115, the CPU 111 displays the already-existing information image to inform that the aforementioned transaction information of the item is already stored. When the transaction information item obtained from the code information is not stored in the RAM 115, the CPU 111 stores the aforementioned transaction information of the item into the RAM 115 and displays the registration completion image to inform that the aforementioned transaction information of the item is stored now. Further, the informing means allows the customer to decide whether to store the transaction information additionally or not (Step ST3-6) when informing that the transaction information of the item is already stored. If the customer decides to store it additionally, the CPU 111 stores the aforementioned transaction information of the item additionally to the RAM 115 (Step ST3-3). On the other hand, if the customer decides not to store it additionally, the CPU 111 cancels the additional storing of the aforementioned transaction information of the item to the RAM 115.

According to the detection means and the informing means as mentioned above, double registration of the transaction information of items being purchased is prevented. In addition, missing registration of the transaction information of items is also prevented. That is, the transaction information of items being purchased is correctly registered. Furthermore, it allows the customer to decide whether to store the transaction information additionally or not when informing that the transaction information of the item corresponding to the code information is already stored. If the customer decides to store it additionally, the transaction information of the item is stored in the mobile terminal 110. If the customer decides not to store it additionally, the transaction information of the item is not stored in the mobile terminal 110.

As mentioned above, the respective operations at the measuring device 70 (First issuance control) are terminated. Next, the customer brings the mobile terminal 110 in which the transaction information of the items is stored to the account device 20 where the customer makes payment for them. When the customer purchases items other than the sold-by-weight items, the customer separately scans bar codes of the items by using the scanner 117 of the mobile terminal 110. Accordingly, the transaction information of the items is also stored in the RAM 115.

Figure 21:
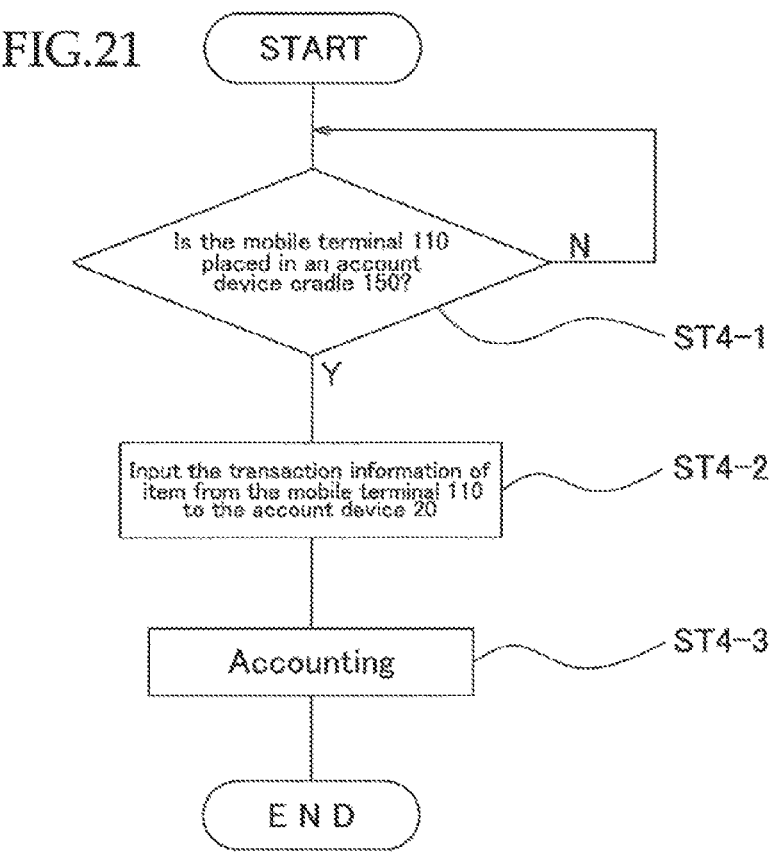
FIG. 21 is a flow chart showing an accounting method using the mobile terminal 110 at the account device 20.

FIG. 21 is a flow chart showing an accounting method using the mobile terminal 110 at the account device 20. When the mobile terminal 110 is placed in the account device cradle 150 at the account device 20 (Step ST4-1), the transaction information of the items stored in the RAM 115 is transmitted from the mobile terminal 110 to the RAM 27 of the account device 20 via the account device cradle 150 and is stored in the RAM 27 (Step ST4-2). After that, the accounting operation is conducted in a conventional manner (Step ST4-3). That is, the accounting operation is normally conducted by using the transaction information of all of the items (the items measured by the measuring device 70 and the general items not measured), whereby the customer makes payment for them.

After the checkout at the account device 20, the mobile terminal 110 is placed in a cradle from which another customer can bring out the mobile terminal 110. As the mobile terminal 110 is placed in the cradle, the transaction information of items and the identification number (IP address or the like) of the measuring device 70 stored in the RAM 115 of the mobile terminal 110 are initialized so that the mobile terminal 110 is allowed to be used by another customer.

According to the aforementioned item registration apparatus 3 (comprising the measuring device 70, the measuring device cradle 100, the mobile terminal 110, and the communication line connecting them. The measuring device cradle 100 may not be included.), the item is put on the weighing tray 73 of the measuring device 70 so that the weight of the item is measured and the transaction information of the item of which weight is measured is stored in the mobile terminal 110, thereby eliminating the need for the scanning of code information by the mobile terminal 110. Therefore, the registration of sold-by-weight item(s) is easily conducted by using the mobile terminal 110. Hereinafter, the operation by a customer will be described in detail.

(1) Place the mobile terminal 110 in the measuring device cradle 100.

(2) Put an item on the measuring device 70.

(3) A label is issued from the measuring device 70 (If the code information is stored in the mobile terminal 110 from the measuring device 70 through the communication, a label without code information is issued. If the code information is not stored in the mobile terminal 110, a label with code information is issued.

(4) Attach the label.

(5-1) If the label without code information is issued and another item is intended to be registered, repeat the above (2)-(4).

(5-2) If the label with code information is issued, scan the code information by using the mobile terminal 110. By taking the mobile terminal 110 from the measuring device cradle 100 to scan the code information and returning the mobile terminal 110 to the measuring device cradle 100 after scanning the code information, registration operation of item(s) is allowed to be continued.

(5-3) Also after cancelling the purchase, by taking the mobile terminal 110 from the measuring device cradle 100 and returning the mobile terminal 110 the measuring device cradle 100, the registration operation of item(s) is allowed to be continued.

(6) Take the mobile terminal 110 from the measuring device cradle 100 to terminate a series of operations.

For registering a plurality of items in series, since normally a label without code information is issued, the customer just repeat the operation of attaching labels issued from the measuring device 70 after placing the item on the measuring device 70 (Only when there is communication error between the measuring device 70 and the mobile terminal 110, the operation of scanning code information on the label is also required). Accordingly, the effort and number of times of operating the mobile terminal 110 can be dramatically reduced, thus providing significantly improved operability to customers.

On the other hand, in case that a customer puts an item on a measuring device, attaches a label with code information issued from the measuring device, scans the code information by a mobile terminal, and repeats the operation every item being purchased, the effort and number of times of operating the mobile terminal are increased, thus making the operation cumbersome and complicated.

Next, at the account device 20, the checkout is easily done by the following operation:

(1) Place the mobile terminal 110 in the account device cradle 150 connected to the account device 20.

(2) The account device 20 automatically obtains transaction information of sold-by-weight items (and other items) from the mobile terminal 110.

(3) Accounting details and billing amount are displayed on the staff-side display 31 (and the customer-side display 33) of the account device 20.

(4) Make payment according to the billing amount (a receipt after paid is issued).

(5) Remove the mobile terminal 110 from the account device cradle 150.

[In Case Without Using a Mobile Terminal 110 (Second Issuing Control Means)]

When no mobile terminal 110 is placed in the measuring device cradle 100 (No at Step ST2-1), a customer puts a desired amount of the item (apples in this example) on the weighing tray 73 of the measuring device 70 (Step ST2-27), the measuring device 70 measures the weight of the item in the same manner as mentioned in the above case (Step ST2-7). As shown in FIG. 25, as the item is put on the weighing tray 73, the weight of the item is measured (Step ST2-7-1). If a measurement stable signal is output (Step ST2-7-2), the measured value is fixed (Step ST2-7-3). During measurement of item, the display 77 may display a massage, for example "Now, measuring".

Then, the display 77 of the measuring device 70 displays an item selection image, for example, as shown in FIG. 13 (Step ST2-8). The customer touches a tab and an indicated item to select the item put on (Step ST2-9). When the item is selected, the CPU 81 of the measuring device 70 calculates the price of the item and displays a purchase confirmation image, for example, as shown in FIG. 14 (Step ST2-10). In this case, a button "continue shopping" is not displayed.

When the customer touches the cancel button in the purchase confirmation image shown in FIG. 14, the measuring process at the measuring device 70 (the second issuing control) is terminated because the connection flag is "0" (Step ST2-28). That is, no label is issued.

Figure 27:
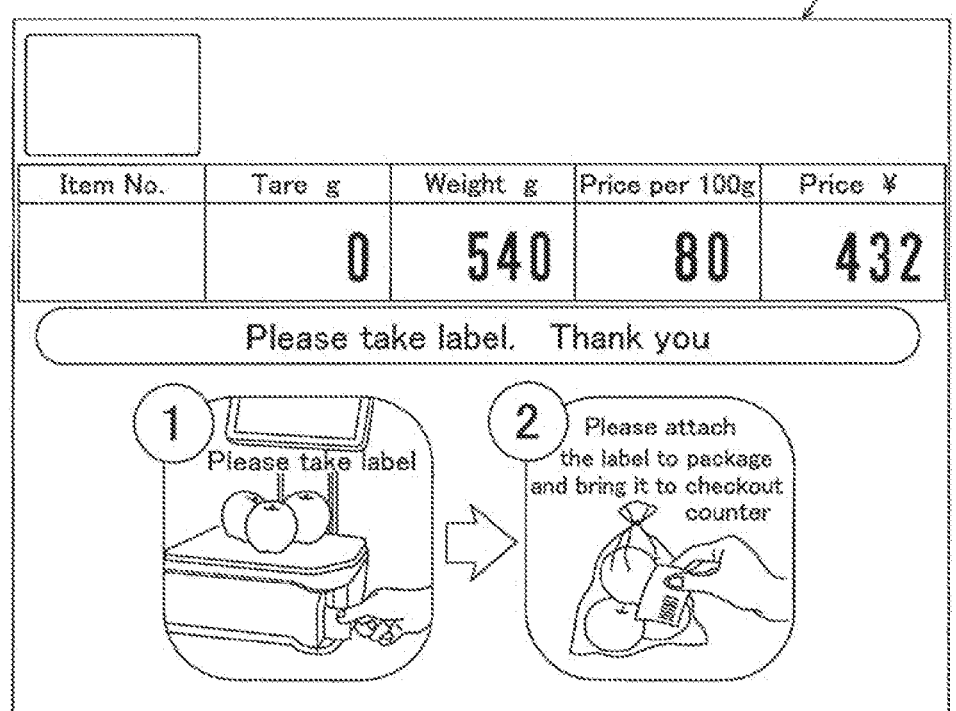
FIG. 27 is an illustration showing an example of a display image on the display 77 of the measuring device 70.

On the other hand, when the customer touches the label issuing button in the purchase confirmation image shown in FIG. 14 (Step ST2-12), the process proceeds to Step ST2-29 because the connection flag is "0" so that the measuring device 70 issues a label with code information. The label with code information issued at this time is similar to the label with code information issued at the aforementioned Step ST2-24 and is, for example, the same as the label shown in FIG. 19. Then, the display 77 shows, for example, a label-with code information issued image as shown in FIG. 27 (Step ST2-30). The label-with-code information issued image on the display 77 includes instructions for promoting the customer to take the label from the measuring device 70 and attach the label to a package of the item, and further bring the item to the account device 20. Accordingly, the measuring process of the measuring device 70 (the second issuing control) is terminated. After that, normal accounting process is conducted by scanning the code information on the label at the account device 20, whereby the customer makes payment for it.

As mentioned above, the measuring device 70 comprises the first issuing control means whereby when communication with the mobile terminal 110 through the communication portions 93, 124 and the access point 50 (communicating means) is detected (Yes at Step ST2-1), the measuring device 70 issues a label (Step ST2-16) on condition of receiving a measurement stable signal for the item measured by the measuring device 70 (Step ST2-7-2) and transaction information of the item sent from the measuring device 70 to the mobile terminal 110 (Step ST2-14), and the second issuing control means whereby when communication with the mobile terminal 110 is not detected (No at Step ST2-1), the measuring device 70 issues a label on condition of receiving only a measurement stable signal (Step ST2-7-2). Accordingly, even labels issued in a state of communication with the mobile terminal 110 and labels issued in a state of no communication with the mobile terminal 110 can be issued quickly by the single measuring device 70 without trouble. That is, the single measuring device 70 can quickly issue labels corresponding to customers using the mobile terminal 110 and also corresponding to customers not using the mobile terminal 110 without trouble. Furthermore, the measuring device can easily accommodate even in a case where customers using the mobile terminal 110 and customers not using the mobile terminal 110 are mixed in the same store.

Further, the measuring device 70 mentioned above sends transaction information of measured items to the mobile terminal 110 (Step ST2-14) after communication with the mobile terminal 110 is established by the communication portions 93, 124 and the access point 50 (communicating means) (Step ST2-1 through 2-4), whereby the transaction information of items is stored in the mobile terminal 110 without fail when communicating with the mobile terminal 110 and the transaction information of items is transmitted to the account device 20, allowing easy accounting.

Furthermore, when the receipt confirmation signal is not received from the mobile terminal 110 within the predetermined time period (Step ST2-15) after the transaction information of items is sent from the measuring device 70 to the mobile terminal 110, the measuring device 70 issue a label with code information, that is, a label equal to the label by the second issuing means for the case not using the mobile terminal 110 (Step ST2-24). Since it is impossible to send and store the transaction information of items measured by the measuring device 70 into the mobile terminal 110 when communication between the measuring device 70 and the mobile terminal 110 is not established, it is made to issue a label with code information in the same manner as the case according to the second issuing control means.

Though the measuring method of the measuring device 70 (the flow chart shown in FIG. 8 and FIG. 9) has a configuration of combining use of two methods, i.e. the measuring method using the mobile terminal 110 (the first issuing control means) and the measuring method without using the mobile terminal 110 (the second issuing control means), the measuring method may consist only of the measuring method using the mobile terminal 110 (the first issuing control means) instead. FIG. 10 and FIG. 11 show a flow chart showing an operational example of the measuring device 70 in case of consisting only of the measuring method using the mobile terminal 110.

Figure 8:
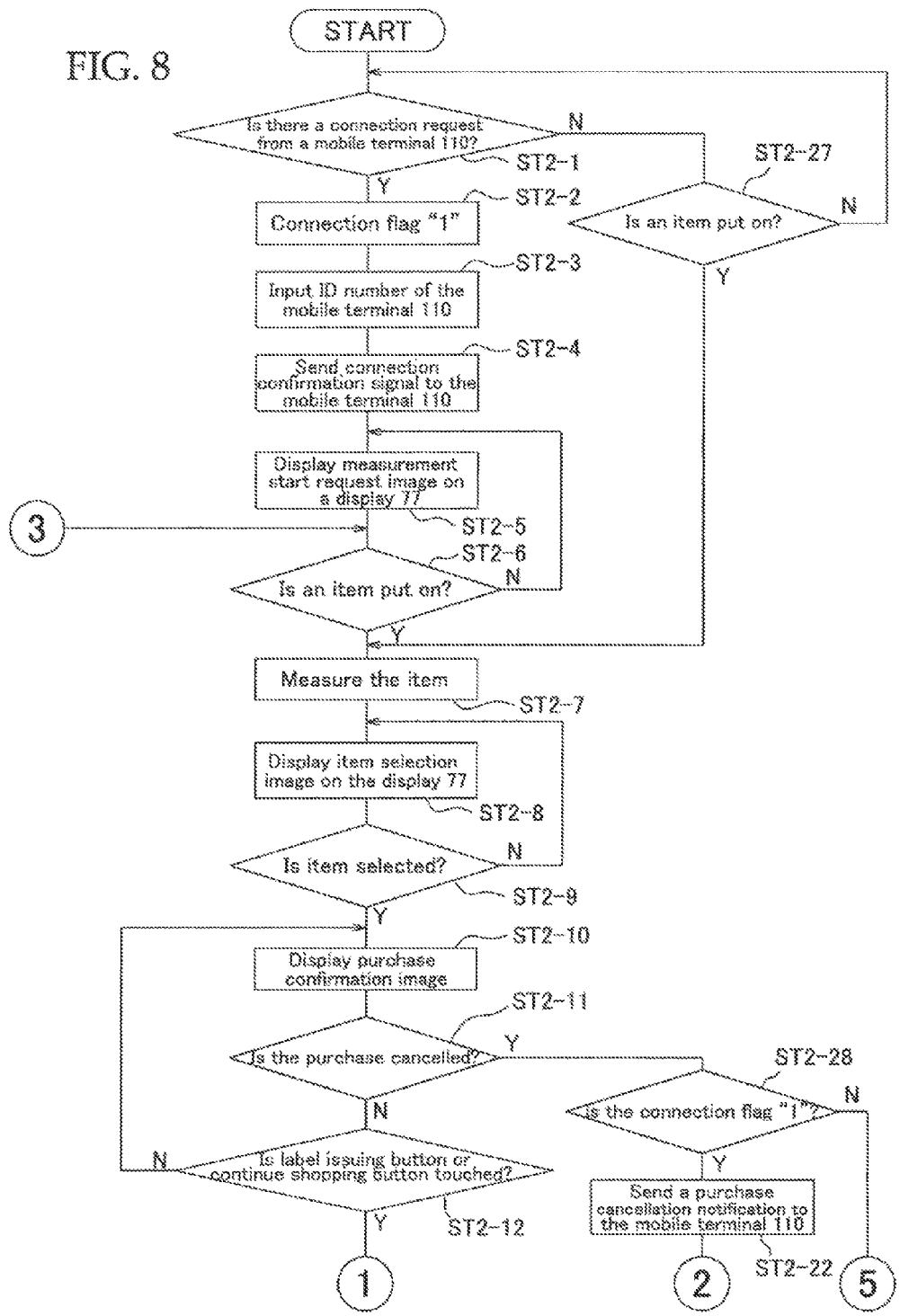
FIG. 8 is a flow chart (front-half) showing one operational example of the measuring device 70.
Figure 9:
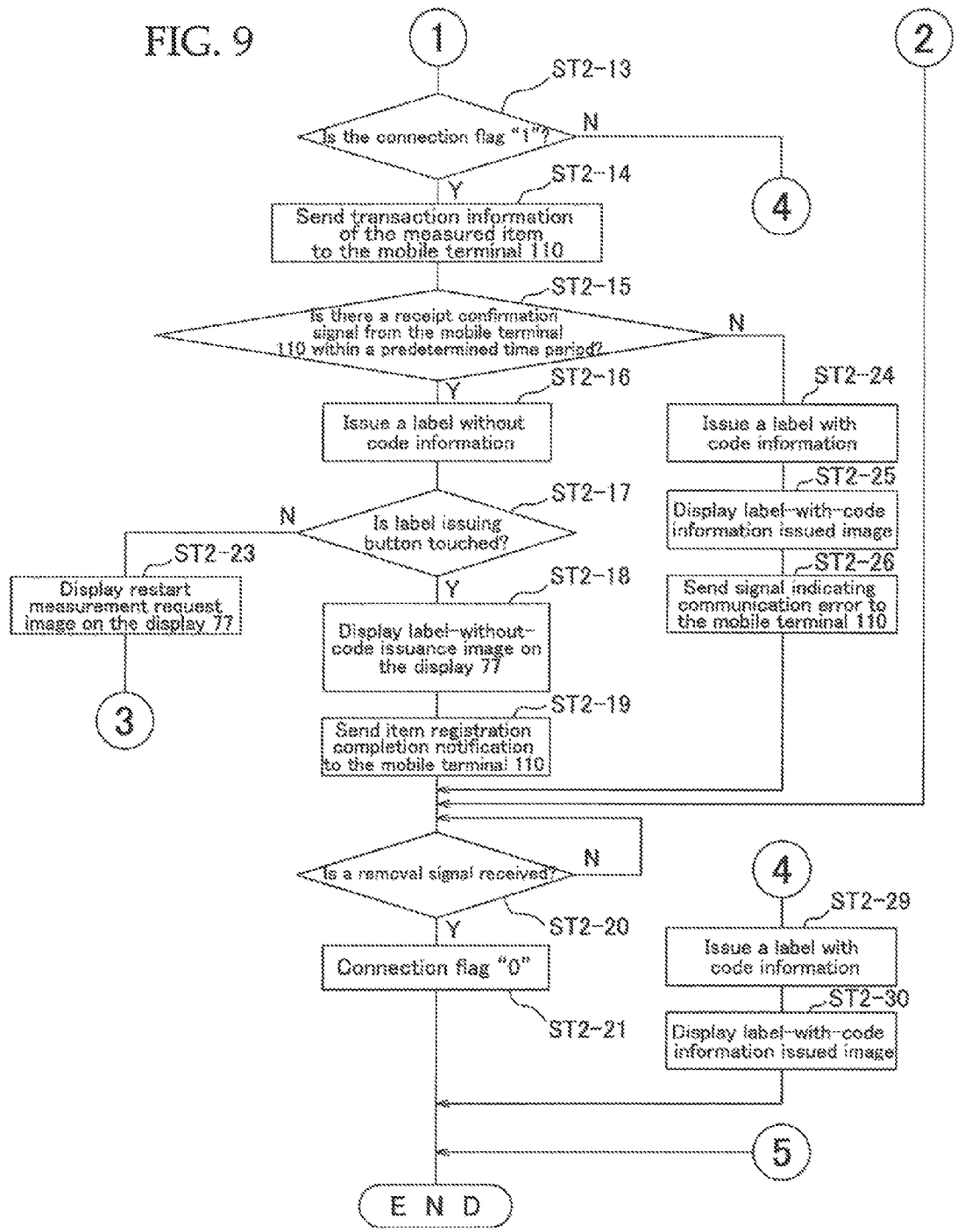
FIG. 9 is a flow chart (last-half) showing the operational example of the measuring device 70.
Figure 10:
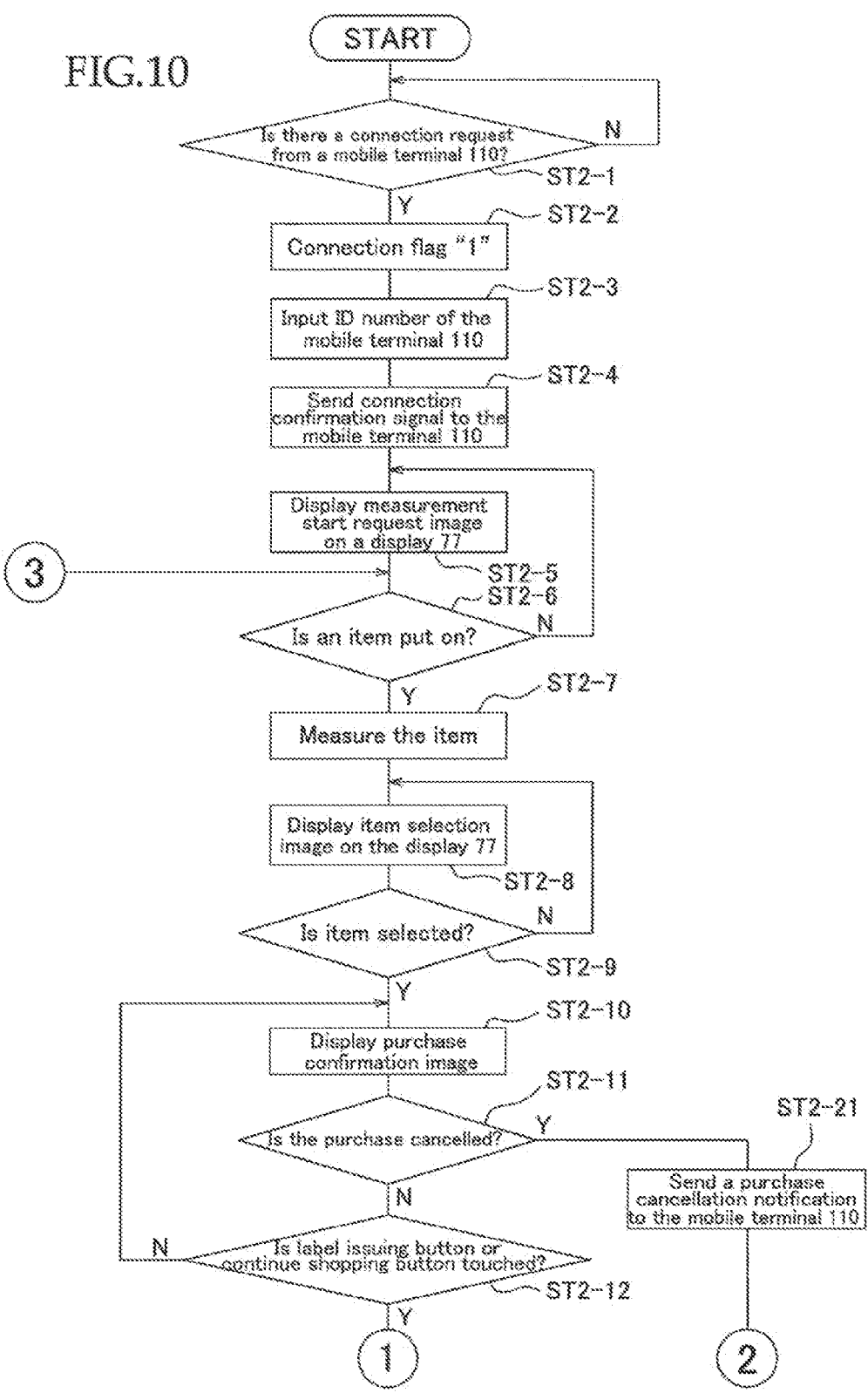
FIG. 10 is a flow chart (front-half) showing another operational example of the measuring device 70.
Figure 11:
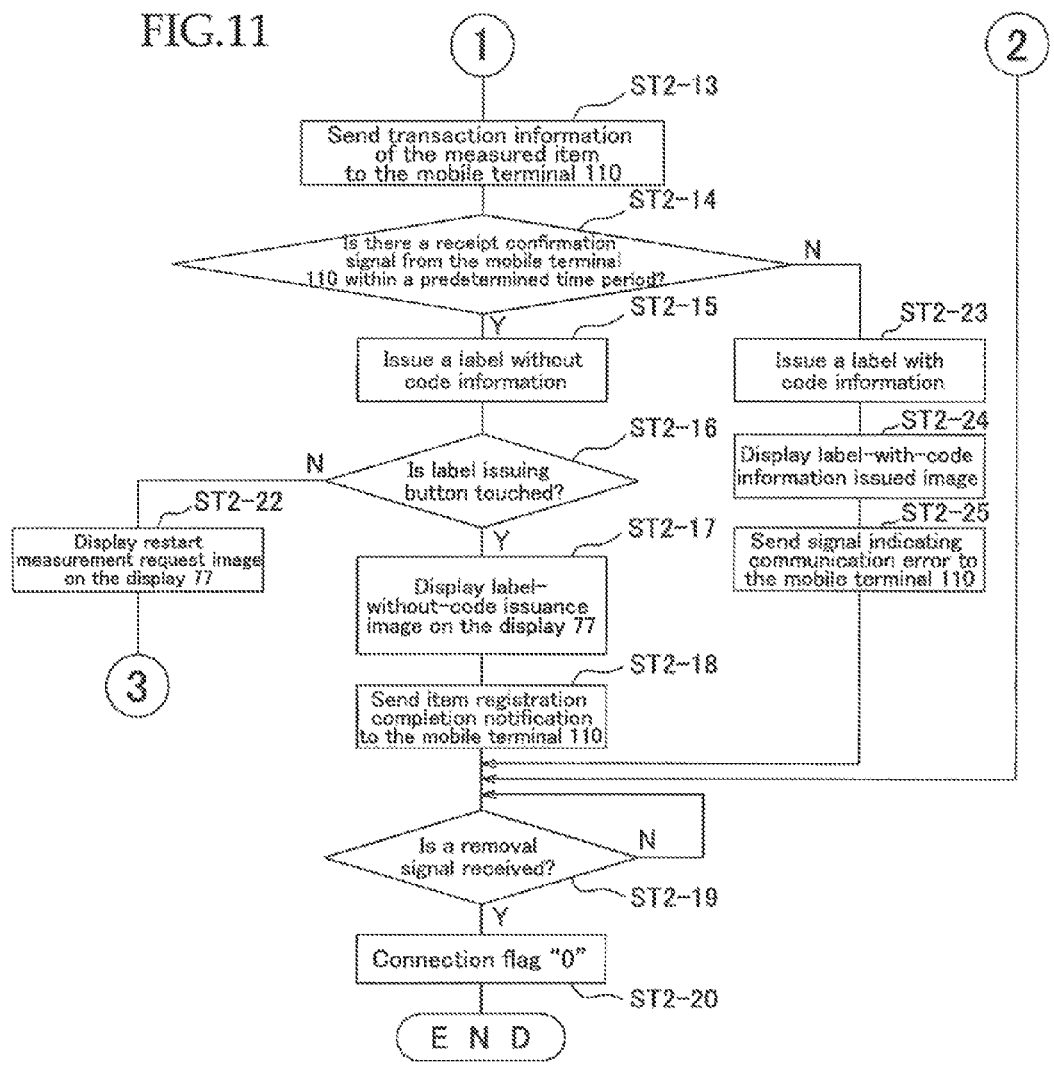
FIG. 11 is a flow chart (last-half) showing the operational example of the measuring device 70.

The flow chart shown in FIG. 10 and FIG. 11 differs from the aforementioned flow chart shown in FIG. 8 and FIG. 9 in that the Steps ST2-13, 27, 28, 29, and 30 in the flow chart shown in FIG. 8 and FIG. 9 are omitted. That is, the flow chart shown in FIG. 10 and FIG. 11 is a flow chart without portions relating to the measuring method without using the mobile terminal 110 (the second issuing control means).

That is, in the flow chart shown in FIG. 10 and FIG. 11, measurement is not conducted until connection request from the mobile terminal 110 is received (Step ST2-1) because the Step ST2-27 shown in FIG. 8 is omitted. Since the connection flag is "1" whenever the measurement is conducted, the Step ST2-28 in FIG. 8 and the Step ST2-13 in FIG. 9 are unnecessary. In addition, the Steps ST2-29 and 30 in FIG. 9 to be conducted when the connection flag is determined as "0" are also unnecessary. The actions at other steps in FIG. 10 and FIG. 11 are the same as described with regard to FIG. 8 and FIG. 9. It should be noted that the steps in FIG. 10 and FIG. 11 corresponding to the Step ST2-14 through 2-26 in FIG. 8 and FIG. 9 have digits decreased by one respectively, i.e. Step ST2-13 through 2-25 of FIG. 10 and FIG. 11 because the Step ST2-13 in the flow chart of FIG. 8 and FIG. 9 is omitted in the flow chart of FIG. 10 and FIG. 11.

Though the embodiments of the present invention are described in the above, the present invention is not limited to the aforementioned embodiment and various modifications may be made without departing from the scope in technical idea as defined in the appended claims, the specification, and the drawings. For example, though the measuring device cradle 100 is used for making a one-on-one relationship between the measuring device 70 and the mobile terminal 110 in the aforementioned embodiment, the measuring device 70 and the mobile terminal 110 may have directly one-on-one relationship without the measuring device cradle 100. That is, the measuring device 70 and the mobile terminal 110 may be connected by a code, thus making a direct one-on-one relationship between the measuring device 70 and the mobile terminal 110.

Further, for example, the measuring device cradle 100 and the mobile terminal 110 may be configured to allow communication therebetween so that the transaction information of items sent from the measuring device 70 is received by the mobile terminal 110 through the measuring device cradle 100. That is, any configuration allowing connection between the measuring device 70 and the mobile terminal 110 via communication channel may be employed.

Though the account device cradle 150 is employed as an import means for taking the transaction information of items stored in the mobile terminal 110 into the account device 20 in the aforementioned embodiment, another import means, for example, wireless communication between the mobile terminal 110 and the account device 20 may be employed to take the transaction information of items stored in the mobile terminal 110 to the account device 20.

Figure 22:
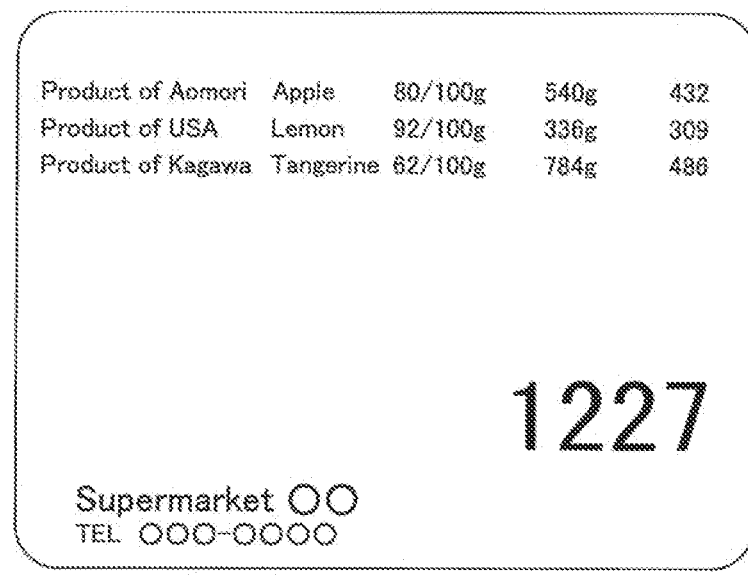
FIG. 22 is an illustration showing an example of a label without code information, the label being only one issued after measuring all of items.
Figure 23:
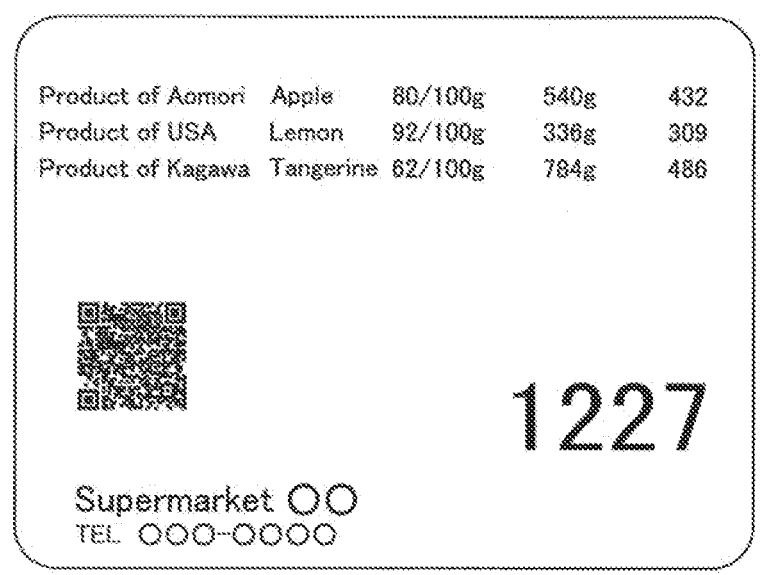
FIG. 23 is an illustration showing an example of a label with code information, the label being only one issued after measuring all of items.

In case of measuring a plurality of items repeatedly, the measuring device 70 is configured to issue a label every measurement of item in the aforementioned embodiment. Instead of this, the measuring device 70 may be configured to issue a plurality of labels of items at a time after all of the items are measured. Alternatively, the measuring device 70 may be configured to issue a single label for all of the items after all of the items are measured. FIG. 22 and FIG. 23 each shows an example of the label being only one issued after measuring all of items. FIG. 22 shows an example of a label without code information and FIG. 23 shows an example of a label with code information. The code information on the label shown in FIG. 23 is two-dimensional code because of the large amount of information.

In case of purchase cancellation, transaction information of items measured before the purchase cancellation is stored in the mobile terminal 110 so that the customer can make payment for the stored items at the account device 20 in the aforementioned embodiment. Instead of this, in case of purchase cancellation, it may be configured that the transaction information of items measured before the purchase cancellation is deleted from the RAM 115 of the mobile terminal 110, thus not allowing the customer to make payment for them.

When a communication error between the measuring device 70 and the mobile terminal 110 occurs, transaction information of items measured before the occurrence of communication error is stored in the mobile terminal 110 so that the customer can make payment at the account device 20 for the stored items and the item of which label has code information printed because the communication error in the aforementioned embodiment. Instead of this, in case of occurrence of communication error, it may be configured that the customer is allowed to make payment at the account device 20 for only the item of which label has code information printed because of the communication error and that the transaction information of items (of which issued label has no code information printed) before the occurrence of communication error is deleted from the RAM 115 of the mobile terminal 110, thus not allowing the customer to make payment for them.

In the aforementioned embodiment, the sales price is calculated from the weight of item according to a price per unit weight. In case of apples or the like, weights of apples are substantially equal to each other. Therefore, by preliminarily storing the range of unit weight in the RAM 87 of the measuring device 70 and calculating the number of the item from the measured weight, the sales price may be calculated according to a unit price.

Though the mobile terminal 110 is employed as external equipment in the aforementioned embodiment, the external equipment may be the control device 10, the account device 20, or the like. If transaction information of items is stored in the control device 10 (or the account device 20), the customer brings the mobile terminal 110 to the account device 20 whereby the account device 20 obtains the number of the mobile terminal 110 and therefore obtains the stored transaction information of items from the control device 10 (or the account device 20 itself), thereby conducting checkout. Further, in the aforementioned embodiment, a difference between the printing form for printing labels issued according to the first issuing control means and the printing form for printing labels issued according to the second issuing control means is whether code information is printed or not. However, the printing form other than code information may be different.

The mobile terminal 110 may be used by the customer for several times by communicating with different measuring devices 70. That is, it is available in case that No. 1 measuring device 70 is determined to be used for measuring items 1 through 3 and No. 2 measuring device 70 is determined to be used for measuring items 4 through 6. Especially, this configuration is helpful when the items 1 through 3 are located away from the items 4 through 6 in a store.

In this case, the IP address of the measuring device 70 stored in a predetermined area of the RAM 115 of the mobile terminal 110 is overwritten serially and stored. Accordingly, the mobile terminal 110 can accurately know which measuring device 70 is now communicating.

Instead of overwriting, the RAM 115 of the mobile terminal 110 may be divided into areas for storing IP addresses so that the mobile terminal 110 specifies the IP address of a now communicating measuring device 70 on the basis of the area in which the IP address of the closest measuring device 70 is stored.

In the aforementioned embodiment, when communication with the mobile terminal 110 is detected, the measuring device 70 issues a label on condition of receiving the measurement stable signal for the item measured by the measuring device 70, press (operation) of the label issuing button (issue key), and the receipt confirmation signal from the mobile terminal 110 indicating the receipt of the transaction information of the item which was sent from the measuring device 70 to the mobile terminal 110 (the first issuing control means), while when communication with the mobile terminal 110 is not detected, the measuring device 70 issues a label on condition of receiving the measurement stable signal and the press (operation) of the label issuing button (the second issuing control means). However, in either case, the condition for issuing labels may not always include the press (operation) of the label issuing button. That is, in case of the first issuing control means, when communication with the mobile terminal 110 is detected, the measuring device 70 may issue a label on condition of, at least, receiving the measurement stable signal for the item measured by the measuring device 70 and the receipt confirmation signal from the mobile terminal 110 indicating the receipt of the transaction information of the item which was sent from the measuring device 70 to the mobile terminal 110. In case of the second issuing control means, when communication with the mobile terminal 110 is not detected, the measuring device 110 may issue a label on condition of, at least, receiving the measurement stable signal.

As mentioned above, when communication with the mobile terminal 110 is detected, the measuring device 70 issues a label on condition of, at least, receiving the measurement stable signal for the item measured by the measuring device 70 and the receipt confirmation signal from the mobile terminal 110 indicating the receipt of the transaction information of the item which was sent from the measuring device 70 to the mobile terminal 110 (the first issuing control means). However, the receipt confirmation signal is not necessarily the signal indicating the receipt of the transaction information of the item which was sent from the measuring device 70 to the mobile terminal 110. That is, for example, when the mobile terminal 110 is placed in the measuring device cradle 100 before the start of measurement by the measuring device 70, a signal indicating start of communication is therefore sent from the mobile terminal 110 to the measuring device 70 having the corresponding IP address, the measuring device 70 receiving the signal sends a signal for starting communication to the mobile terminal 110, and the mobile terminal 110 sends a confirmation signal indicating the receipt of the signal again to the measuring device 70 having the corresponding IP address. The receipt confirmation signal from the mobile terminal 110 to the measuring device 70 may be this confirmation signal. Further, the receipt confirmation signal may be another signal from external equipment such as the mobile terminal 110.

What is claimed is:

1. An item registration apparatus comprising:
a measuring device having a weighing tray on which an item is put; and a mobile terminal having a scanning means for scanning code information recording transaction information of the item, said measuring device and said mobile terminal being connected via communication channel, wherein
said measuring device has a label issuing means which issues a label of the item measured when the measurement of the item put on said weighing tray is completed or when a predetermined operation is conducted relative to said measuring device, wherein
said mobile terminal has a first storage means for storing transaction information of the item via said communication channel when the measurement of the item put on said weighing tray is completed or when said predetermined operation is conducted, and wherein
said label issuing means issues a label not including said code information when said first storage means stores transaction information of the item, and issues a label including said code information when said first storage means does not store transaction information of the item.

2. An item registration apparatus as claimed in claim 1, further comprising:
a detection means for detecting transaction information of items stored in said first storage means when said scanning means scans said code information of said label; and
an informing means wherein when said detection means detects that the transaction information of item read from said code information is already stored in said first storage means,
said informing means informs that the transaction information of the item is already stored, on the other hand when said detection means detects that the transaction information of item read from said code information is not stored in said first storage means, the transaction information of said item is stored in said first storage means and said informing means informs that the transaction information of said item is now stored.

3. An item registration apparatus as claimed in claim 2, wherein
when said informing means informs that the transaction information of the item is already stored, said informing means informs an option whether or not to additionally store the transaction information of the item in said first storage means, and wherein
when additional storage is selected, said transaction information of the item is additionally stored in said first storage means.

4. An item registration apparatus as claimed in claim 1, wherein
said measuring device further has a second storage means for storing the transaction information of the measured item, wherein
when a plurality of items are measured, said second storage means stores transaction information of each measured item after each measurement of the item put on the weighing tray until the last one of the items put on the weighing tray for measurement is measured, and
when the measurement of the last one of the items put on said weighing tray is completed or when the predetermined operation is conducted, said first storage means stores the transaction information of every item of the measured items stored in said second storage means.

5. An account system comprising:
an item registration apparatus as claimed in claim 1; and
an account device for charging items, wherein
said account device has an acquisition means for acquiring transaction information of the measured item stored in said first storage means, and wherein
said account system charges according to the obtained transaction information of the measured item.

6. A measuring device which has a weighing tray on which an item is put and is connected to a mobile terminal via communication channel, said mobile terminal comprising a scanning means for scanning code information including transaction information of the item, wherein
said measuring device comprises a label issuing means which issues a label of the item measured when the measurement of the item put on said weighing tray is completed or when a predetermined operation is conducted relative to said measuring device, wherein
said measuring devices makes said mobile terminal store transaction information of the item via said communication channel when the measurement of the item put on said weighing tray is completed or when said predetermined operation is conducted, and wherein
said label issuing means issues a label not including said code information when said mobile terminal stores transaction information of the item, and issues a label including said code information when said mobile terminal does not store transaction information of the item.

7. A measuring device for issuing a label for an item measured, comprising:
a communication means for allowing communication with external equipment;
a first issuing control means for controlling issuance of a label on the basis of, at least, a measurement stable signal for the item measured by said measuring device and a signal received from said external equipment when communication with said external equipment via the communication means is detected; and a second issuing control means for controlling issuance of a label on the basis of, at least, said measurement stable signal when communication with said external equipment is not detected.

8. A measuring device as claimed in claim 7, wherein a printing form of the label issued by said first issuing control means is different from the printing form of the label issued by said second issuing control means.

9. A measuring device as claimed in claim 8, wherein
said printing forms are varied by not printing code information on the label issued by said first issuing control means and printing code information on the label issued by said second issuing control means.

10. A measuring device as claimed in claim 7, wherein
after communication with said external equipment is established by said communication means, said measuring device sends the transaction information of the measured item to said external equipment.

11. A measuring device as claimed in claim 7, wherein
when no receipt signal is received from said external equipment within a predetermined time period after the transaction information of the item is sent from said measuring device to said external equipment, the measuring device issues a label equal to the label issued by said second issuing control means.

12. A measuring system comprising: a measuring device as claimed in claim 7; and external equipment which can communicate with said measuring device.

13. An item registration apparatus comprising:

a measuring device having a weighing tray on which an item is put; and a mobile terminal which can be connected to said measuring device via communication channel, wherein said measuring device has a label issuing means which issues a label of the item measured when the measurement of the item put on said weighing tray is completed or when a predetermined operation is conducted relative to said measuring device, wherein said mobile terminal has a first storage means for storing transaction information of the item via said communication channel when the measurement of the item put on said weighing tray is completed or when said predetermined operation is conducted, and wherein said label issuing means does not issue said label when said first storage means stores transaction information of the item, and issues said label when said first storage means does not store transaction information of the item.

14. An account system comprising:

an item registration apparatus as claimed in claim 13 and an account device for charging items, wherein said account device has an acquisition means for acquiring transaction information of the measured item stored in said mobile terminal, and wherein said account device charges according to the obtained transaction information of the measured item.

* * * * *